United States Patent
Fujii et al.

(10) Patent No.: US 10,915,401 B2
(45) Date of Patent: Feb. 9, 2021

(54) DATA SAVING CAUSED BY A PARTIAL FAILURE OF THE MEMORY DEVICE

(71) Applicant: Hitachi, Ltd., Tokyo (JP)

(72) Inventors: Hiroki Fujii, Tokyo (JP); Hideyuki Koseki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 121 days.

(21) Appl. No.: 16/327,787

(22) PCT Filed: Feb. 6, 2017

(86) PCT No.: PCT/JP2017/004251
§ 371 (c)(1),
(2) Date: Feb. 22, 2019

(87) PCT Pub. No.: WO2018/142622
PCT Pub. Date: Aug. 9, 2018

(65) Prior Publication Data
US 2019/0220358 A1 Jul. 18, 2019

(51) Int. Cl.
*G06F 11/00* (2006.01)
*G06F 11/10* (2006.01)
*G06F 11/07* (2006.01)
*G06F 11/20* (2006.01)
*G06F 3/06* (2006.01)

(52) U.S. Cl.
CPC ............ *G06F 11/1092* (2013.01); *G06F 3/06* (2013.01); *G06F 3/0619* (2013.01); *G06F 3/0644* (2013.01); *G06F 3/0689* (2013.01); *G06F 11/0793* (2013.01); *G06F 11/1088* (2013.01); *G06F 11/2092* (2013.01); *G06F 3/0659* (2013.01)

(58) Field of Classification Search
CPC .................................................. G06F 11/1092
See application file for complete search history.

(56) References Cited

U.S. PATENT DOCUMENTS

| | | | | |
|---|---|---|---|---|
| 7,698,591 | B2* | 4/2010 | Zohar | G06F 11/1076 714/6.12 |
| 2002/0062422 | A1* | 5/2002 | Butterworth | G06F 11/0793 711/114 |
| 2007/0050544 | A1* | 3/2007 | Chawla | G06F 11/1092 711/114 |
| 2007/0050667 | A1* | 3/2007 | Zohar | G06F 11/1076 714/6.2 |
| 2007/0220313 | A1* | 9/2007 | Katsuragi | G06F 11/1092 714/6.22 |

(Continued)

FOREIGN PATENT DOCUMENTS

WO 2014/196000 A1 12/2014

*Primary Examiner* — Jonathan D Gibson
(74) *Attorney, Agent, or Firm* — Procopio, Cory, Hargreaves & Savitch LLP

(57) ABSTRACT

A disclosed method includes selecting one or more regions having a predetermined size or more in a logical address space of a first memory drive when the first memory drive is partially failed, transferring data of the one or more selected regions to a second memory drive, reading data from another memory drive, which forms a RAID group with the first memory drive, to restore lost data caused by the partial failure, and writing the restored lost data to the first memory drive.

7 Claims, 23 Drawing Sheets

(56) References Cited

U.S. PATENT DOCUMENTS

| | | | |
|---|---|---|---|
| 2010/0287445 A1* | 11/2010 | Dell | G06F 11/1044 |
| | | | 714/763 |
| 2012/0011396 A1* | 1/2012 | Kitamura | G06F 11/1076 |
| | | | 714/6.22 |
| 2013/0212428 A1 | 8/2013 | Yamamoto et al. | |
| 2014/0298085 A1* | 10/2014 | Baptist | G06F 11/0793 |
| | | | 714/6.2 |
| 2015/0012775 A1* | 1/2015 | Cudak | G06F 11/1458 |
| | | | 714/6.22 |
| 2016/0004615 A1 | 1/2016 | Uehara et al. | |
| 2018/0101438 A1* | 4/2018 | Kazi | G06F 11/2064 |
| 2019/0220358 A1* | 7/2019 | Fujii | G06F 3/0644 |

* cited by examiner

LOGICAL VOLUME INFORMATION TABLE

ACTUAL PAGE INFORMATION TABLE

| RG INFORMATION TABLE |  |
|---|---|
| RG ID | 601 |
| PACKAGE GROUP RAID TYPE | 602 |
| NUMBER OF ACTUAL PAGES | 603 |
| NUMBER OF EMPTY ACTUAL PAGES | 604 |
| FMPKG POINTER | 605 |
| ⋮ | |
| FMPKG POINTER | 605 |

| FMPKG INFORMATION TABLE | |
|---|---|
| FLASH PACKAGE ID | 701 |
| FLASH PACKAGE VIRTUAL CAPACITY | 702 |
| BLOCK CAPACITY | 703 |

| AREA NUMBER (801) | SAVING FLAG (802) | SAVING DESTINATION FMPKG ID (803) |
|---|---|---|
| 0 | SAVING | 3 |
| 1 | NO SAVING | - |
| ⋮ | ⋮ | ⋮ |
| N-1 | NO SAVING | - |

DATA SAVING ADDRESS TABLE

| | AREA NUMBER (903) | SAVING FLAG (904) | SAVING SOURCE FMPKG ID (905) |
|---|---|---|---|
| PRELIMINARY FMPKG ID (901) | 0 | SAVING | 0 |
| | 1 | NO SAVING | - |
| AVAILABLE CAPACITY (902) | ⋮ | ⋮ | ⋮ |
| | N-1 | NO SAVING | - |

PRELIMINARY FMPKG INFORMATION TABLE

| |  |
|---|---|
| REQUEST TYPE | 1002 |
| LOST DATA CAPACITY | 1003 |
| LOST DATA ADDRESS | 1004 |
| ⋮ | |
| LOST DATA ADDRESS | 1004 |

FAILURE NOTIFICATION

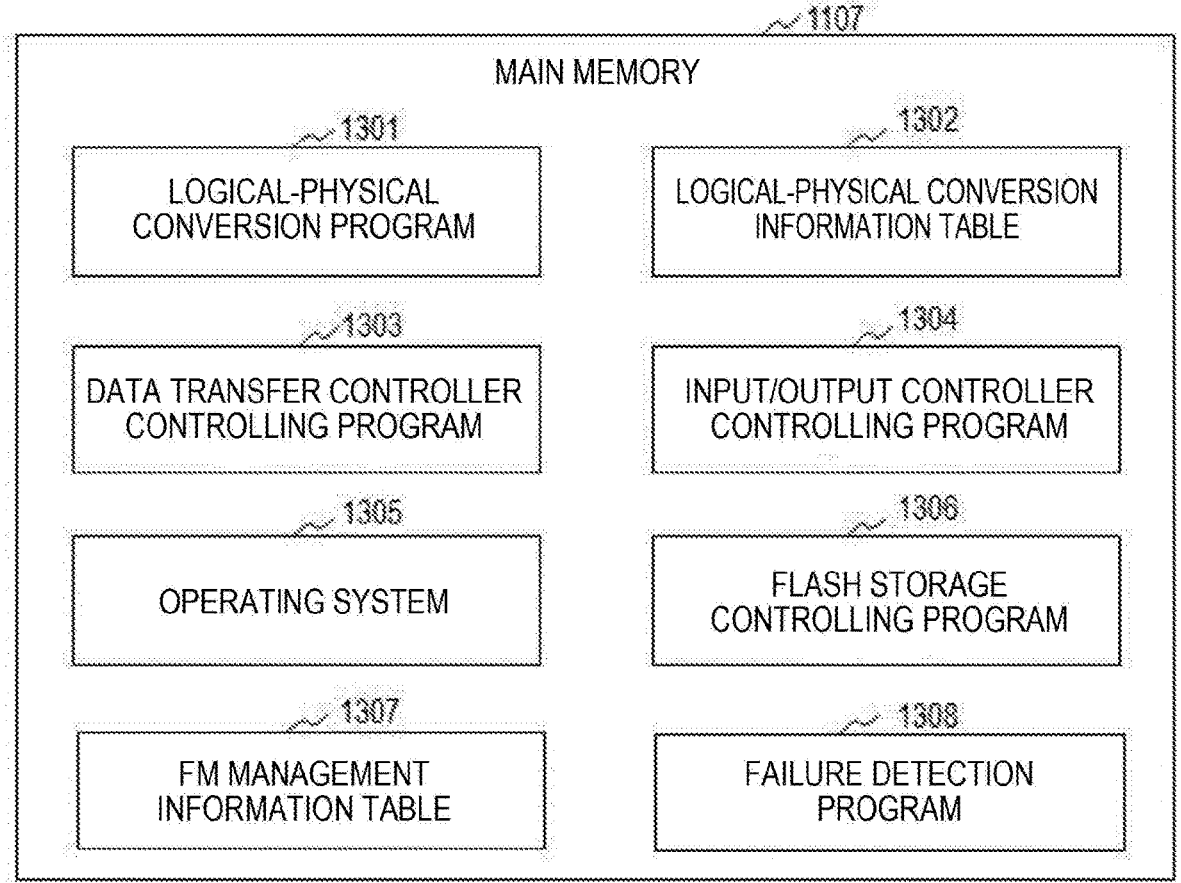

FM MANAGEMENT INFORMATION TABLE

| FMPKG NUMBER | START ADDRESS | END ADDRESS | VFMPKG NUMBER |
|---|---|---|---|
| 0 | 0x000 | 0xAAA - 1 | 0 |
| | 0xAAA | 0xBBB - 1 | 1 |
| | 0xBBB | 0xCCC - 1 | 2 |
| | 0xCCC | 0xDDD - 1 | 3 |

VFMPKG MANAGEMENT TABLE

DATA SAVING CAUSED BY A PARTIAL FAILURE OF THE MEMORY DEVICE

CROSS-REFERENCE TO RELATED APPLICATIONS

This application is a U.S. National Stage entry of PCT Application No: PCT/JP2017/004251 filed Feb. 6, 2017, the contents of which are incorporated herein by reference.

TECHNICAL FIELD

The present invention relates to a control of a plurality of memory drives.

BACKGROUND ART

In recent years, a semiconductor memory device has been come into wide use. The semiconductor memory chip is configured by a hardware architecture in which a plurality of memory chips are included in a drive and driven in parallel. The plurality of memory chips can be operated in parallel as many as the number of chips connected by a bus. With the parallel operation, high input/output performance is achieved. Compared to a Hard Disk Drive (HDD) which is a magnetic memory device of the related art, there are merits on performance improvement by the parallel structure, coping with partial failure, easy performance design from the number of chips and the number of parallels.

As an example of the semiconductor memory device, a memory device using a NAND flash memory (hereinafter, denoted as FM) has been come into wide use. Compared to a NOR semiconductor memory device or other semiconductor memory devices, the FM is excellent in miniaturization, and low in bit cost. The device may be used as a Solid State Drive (SSD) as a substitute of the conventional HDD, or as all flash arrays in which all the memory devices are configured by the FMs.

The SSD enables a high speed input/output compared to the HDD, and is increased in demand. With the miniaturization of the FM and data compression technologies, the capacity of one SSD is increased. Therefore, a collection time when the drive is failed is increased. For example, PTL 1 discloses a technique of saving data in a case where a failure occurs in a part of the memory device. A time taken for restoring is shortened by saving only the failed portion to a spare drive.

CITATION LIST

Patent Literature

PTL 1: US 2013/0212428

SUMMARY OF INVENTION

Technical Problem

The SSD has a short life span. The FM (typically, a NAND FM) writes and reads data in a unit called a page (hereinafter, denoted as "segment" for distinction from a "page" which is a unit of management of a host device). In addition, when rewriting data, the FM is not possible to directly overwrite the data on a physical memory region where the data is stored because of its physical characteristic. In order to perform the rewriting on the data on the physical memory region, the FM necessarily performs an erasing process (hereinafter, referred to as block erasing) on the data on the physical memory region, and then writes the data on the physical memory region on which the block erasing has been performed.

However, the number of times of erasing of each block is limited because of the physical restriction of the FM. Then, if the number of times of erasing of a certain block exceeds the limit, the block is not able to store data. In other words, the SSD runs out of its life span when the number of times of erasing of all the blocks (or preliminary regions) in the SSD exceeds the upper limit.

Then, the life span of the SSD can be made longer using a technique called a wear leveling (hereinafter, referred to as WL). The WL controls a storage position of data such that data to be updated rarely is stored in a block having a large number of times of erasing, or such that data to be updated frequently is stored in a block having a small number of times of erasing. With this configuration, the number of times of erasing between the blocks is leveled. It is suppressed that only a specific block is degraded.

With the WL, the SSD contains information mapping from the logical address to the physical address. The SSD contains a map to convert logical and physical segments which correspond to each other one to one in the conventional HDD, and handles the update of the data storage position of the WL by rewriting the map.

As described above, the FM is configured by a plurality of blocks. A group of the plurality of blocks sharing a signal line is called a plane, and a group of the plurality of planes is called a die. In general, an FM chip is configured by one or more dies.

A case where the data is not allowed to be read from the FM is roughly divided into two cases, that is, an FM life span and a physical failure. As an example of the life span, the number of times of overwriting described above is exceeded, and the stored data is not correctly read even in a case where the error correction is performed. As an example of the physical failure, an access to the FM is not allowed due to a circuit failure of a memory element. An influence range is changed according to a place of the failed circuit, and affects the respective hierarchies of the die, the plane, the block, and the segment.

If an inaccessible region caused by a failure is generated equal to or more than an expected number, the memory region for storing user data is not possible to be secured, and the SSD is blocked. Therefore, the data of the SSD is transferred to a spare drive.

In a case where a failure occurs in a part of the FM in the SSD, and the technique of PTL 1 is applied, lost data is recovered from another RAID drive and stored in the spare drive in the technique. In the SSD, a logical address of the data and a physical storage position are managed by being mapped using the WL technique. Even the data stored in the physically continuous regions is non-continuously distributed on a logical address space. In other words, the lost data saved to the spare drive due to a failure is distributed in a wide range on the logical address space.

A sequential access to the region where the lost data contains is considered. Typically, the continuous data (sequential data) on the logical address space is expected to be read by issuing a command to the drive one time. However, the sequential access to the continuous regions containing the lost data requires two access commands, that is, an access to non-lost data and an access to the lost data. Since the number of times of issuing commands is increased, the resources of the storage controller are consumed, and the performance is degraded.

Therefore, there is desired a technology which can suppress the degradation in access performance in a case where data is saved from the memory drive mapped to the discrete regions in the logical address space to the continuous physical memory regions such as the SSD.

Solution to Problem

As a representative example of the invention, there is provided a computer which controls a plurality of memory drives. The computer includes a memory, a processor which operates according to a program stored in the memory. The processor selects one or more regions having a predetermined size more in a logical address space of a first memory drive when the first memory drive is partially failed, transfers data of the selected one or more regions to a second memory drive, reads data from another memory drive, which forms a RAID group with the first memory drive, to restore the data lost due to the partial failure, and writes the restored lost data to the first memory drive.

Advantageous Effects of Invention

According to an example of the invention, it is possible to suppress that access performance is reduced after data saving due to a partial failure in the memory drive.

BRIEF DESCRIPTION OF DRAWINGS

FIG. 6 is a diagram illustrating a format of an RG information table.
FIG. 7 is a diagram illustrating a format of an FMPKG information table.
FIG. 8 is a diagram illustrating a format of a data saving address table.
FIG. 9 is a diagram illustrating a format of a preliminary FMPKG information table.
FIG. 10 is a diagram illustrating a format of a failure notification.
FIG. 13 is a diagram illustrating a configuration of a program which is stored in a memory of the flash memory package.
FIG. 14 is a diagram illustrating a format of a logical-physical conversion information table.

DESCRIPTION OF EMBODIMENTS

Hereinafter, embodiments of the invention will be described using the drawings. Further, the embodiments are described as merely exemplary to realize the invention, and not limit the technical scope of the invention.

Figure 1A:
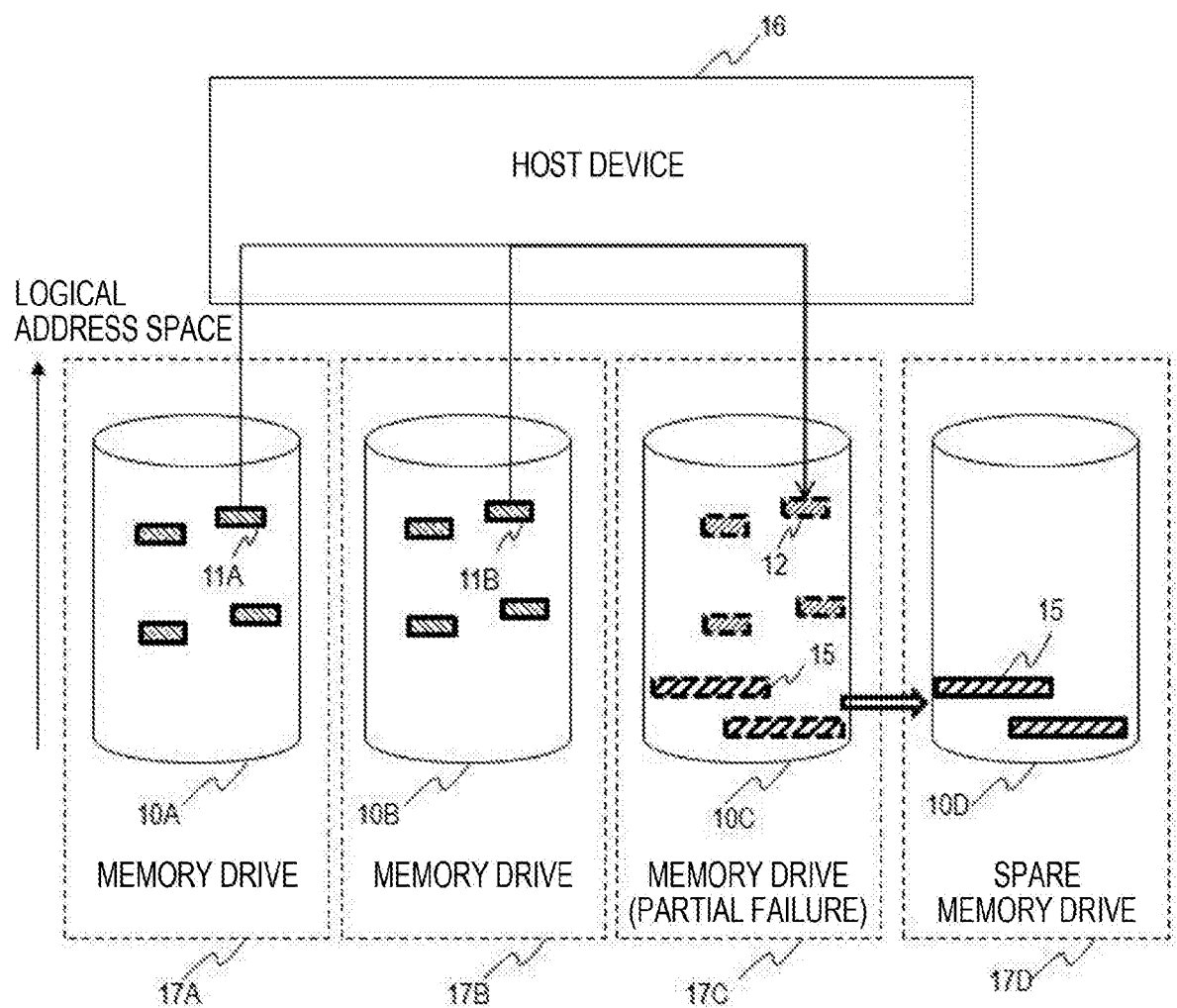
FIG. 1A is a diagram illustrating an outline of the disclosure.

In the following, data saving caused by a partial failure of the memory drive (also referred to as a memory device or the drive) will be disclosed. FIG. 1A illustrates an outline of an embodiment. Memory drives 17A to 17C configure a RAID (Redundant Arrays of Inexpensive Disks). The memory drives (also referred to as memory devices) 17A to 17D each provide memory regions (volumes) 10A to 10D of a logical address space. The memory drive 17A to 17D are, for example, flash drives.

Mapping the logical address space and a physical address space of the memory drive is dynamic, and a physical address to be mapped to a logical address may be changed. One logical address region may be mapped to a plurality of physical address regions, and one physical address region may be mapped to a plurality of logical address regions.

In FIG. 1A, the partial failure occurs in the memory drive 17C, and a data block 12 of the plurality of discrete logical address regions is lost. The partial failure is, for example, a failure of one die. The available capacity of the memory drive 17C is insufficient due to the partial failure. A host device 16 transfers some pieces of data in the memory drive 17C to the spare memory drive 17D. The data transfer includes copying data to a destination and erasing data in the source.

The host device 16 transfers a predetermined size of data block (data of one logical address region) 15 to the memory drive 17D in the logical address space of the memory drive 17C where the partial failure occurs. In the example of FIG. 1A, two data blocks 15 are transferred. The available capacity of the memory drive 17C is increased by the data transfer.

The host device 16 restores the lost data block 12 by data blocks 11A and 11B of the other memory drives 17A and 17B of the RAID, and writes the lost data block to the memory drive 17C.

The data to be transferred to the spare memory drive 17D is cut out of a continuous memory region more than a predetermined size or more in the logical address space of the memory drive 17C. Therefore, the number of times of issuing the I/O request to the memory drive after the data transfer is reduced, and the I/O performance is suppressed from being lowered. The data to be transferred may be data of one continuous logical address region, or may be data of one or more memory regions having the predetermined size or more. The plurality of memory regions having the predetermined size or more may have the same size or different sizes.

First Embodiment

Figure 1B:
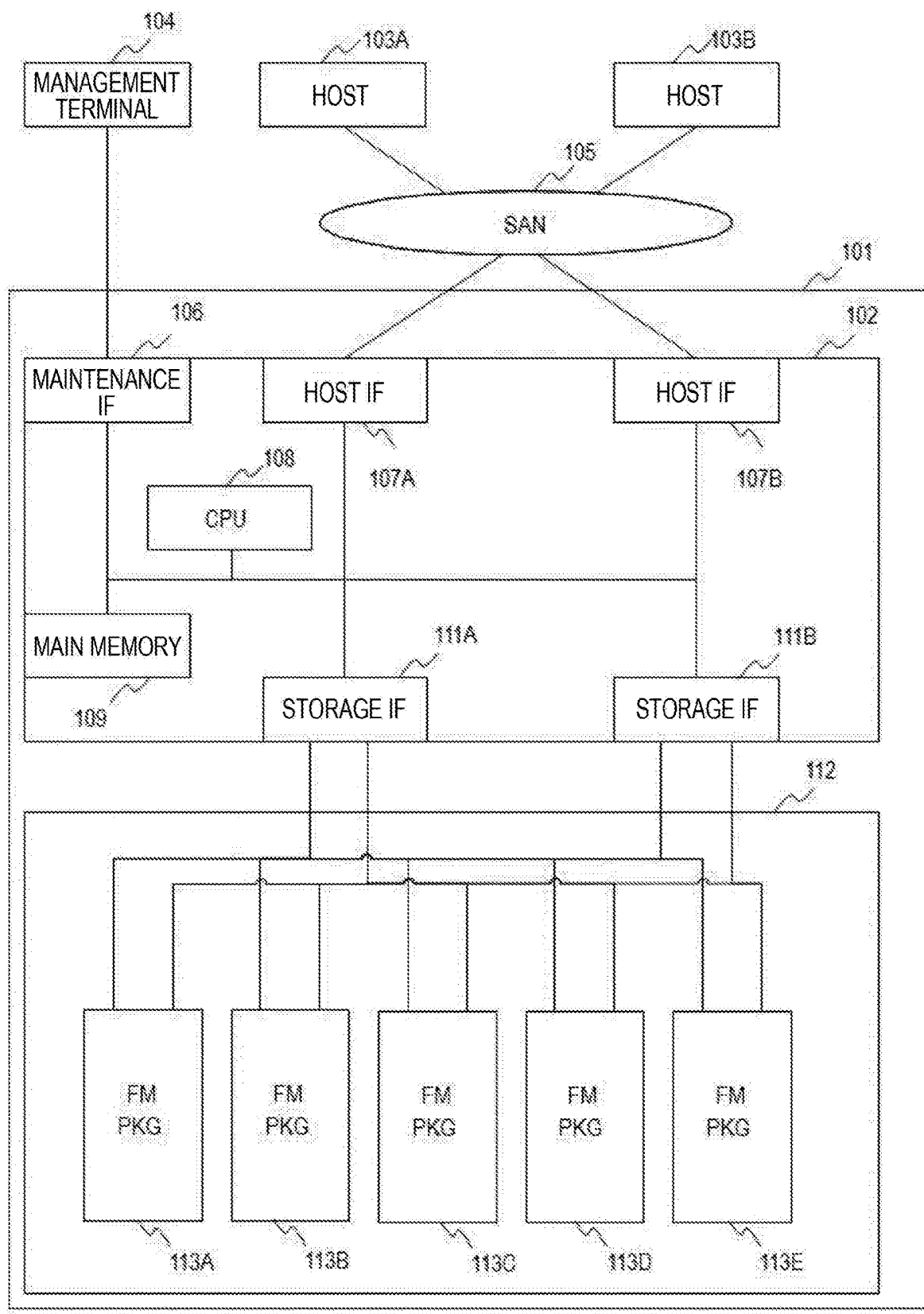
FIG. 1B is a diagram illustrating a configuration of a system.

FIG. 1B illustrates a configuration of a computer system of a first embodiment. The computer system includes a storage system 101, one or more host computers 103A and 103B, and a management terminal 104. Each of the host computers 103A and 103B is connected to the storage system 101 through a Storage Area Network (SAN) 105.

The storage system 101 includes the storage controller 102 and a plurality of flash memory storage drives 113A to 113E. In the drawings and the following description, the flash memory storage drive may be called a Flash Memory Package (FMPKG). Further, in this embodiment, the storage controller 102 is provided by one. However, a plurality of storage controllers 102 may be redundantly configured.

The storage controller 102 includes a Central Processing Unit (CPU) 108, a main memory 109, a plurality of host Interfaces (IFs) 107A and 107B, a plurality of storage IFs 111A and 111B, and a maintenance IF 106. The components in the storage controller 102 are connected through a bus. The main memory 109 includes a region to store a program for controlling the storage system 101 and a region as a cache memory to temporally store data. The CPU 108 controls the storage system 101 according to the program stored in the main memory 109.

The CPU 108 which is a processor operates as a predetermined function unit according to the program. Therefore, in the description using the program as a subject, the subject may be replaced with the CPU 108 or the storage system 101 which includes the CPU 108.

The storage controller 102 controls a plurality of memory drives as a RAID group (RG) for example. In addition to the FMPKG, other memory drives may be used such as a Serial Attached Small Computer System Interface (SAS)-Hard Disk Drive (HDD) and a Serial Advanced Technology Attachment (SATA)-HDD. In the following description and the drawings, such a memory drive (memory device) may be called Physical Device (PDEV).

The host IFs 107A and 107B are interfaces which communicate with the host computers 103A and 103B. The maintenance IF 106 is an interface which is connected to the management terminal 104 and communicates with the management terminal 104.

A manager manages and maintains the storage controller 102 from the management terminal 104. The management terminal 104 is not essential, and may manage and maintain the storage controller 102 from, for example, the host computer.

In the system of the above computer, the host computers 103A and 103B and the FMPKGs 113A to 113E are connected through the storage controller 102. Alternatively, for example, the storage controller 102 may be omitted, and the host computers 103A and 103B and the FMPKGs 113A to 113E may be directly connected. In the following, the FMPKG 113 illustrates one or more FMPKGs in the storage system 101.

Further, the technology of the disclosure can be applied to a hyper-converged system. The hyper-converged system is a system which connects a plurality of servers (nodes) containing a local storage such as an HDD or an SSD therein to form a cluster. A hypervisor having a virtualization function operates in the server. The hypervisor activates a server virtual machine and a storage virtual machine defined by software. In addition, the technology of the disclosure can be applied to a system in which the memory drive and the storage controller are connected through a network.

The configurations of a logical volume and a flash volume will be described before describing the information managed by the storage system 101 in this embodiment. A unit of assigning the memory region is called a page.

Using FIG. 2, the relation between the logical volume, a virtual page, an actual page, and the RG will be described. The storage controller 102 defines one or more logical volumes, and can provide the logical volume to the host device of a host computer 103. Further, the host computer 103 indicates one or more host computers of the host computers 103A and 103B.

In this embodiment, the space of the logical volume is a space to be divided in a unit of virtual page, and the memory region of the RG 204 is a region to be divided in a unit of actual page. The storage controller 102 manages the memory space of each logical volume by dividing the space in a predetermined unit called a plurality of virtual pages. FIG. 2 illustrates virtual pages 202A, 202B, and 202C.

Further, the size of the virtual page is stored in a virtual page capacity 308 in the main memory 109. In the storage system 101 according to this embodiment, the capacities of all the virtual pages are set to be equal. However, there may be a virtual page having different size in the storage system 101.

The virtual page is used only to manage the memory space of the logical volume in the storage controller 102. The host computer 103 designates an access target memory region using the logical address such as a Logical Block Address (LBA) when the host computer makes an access to the memory region of the logical volume.

When the host computer 103 issues an access request to the logical volume, the storage controller 102 converts the LBA designated by the host computer 103 into a virtual page number (an identification number attached to each virtual page) and a relative address (an offset address from the head of the virtual page) in the virtual page.

The conversion can be realized by subtracting the LBA from the virtual page size. If the size of the virtual page is P (MB), the P (MB) region from the head position of the logical volume is managed as the virtual page #0 (#0 indicates the virtual page number). The next P (MB) region is managed as the virtual page #1. Thereafter, the P (MB) regions are similarly managed as the virtual pages #2, #3, and so on.

Immediately after the storage controller 102 defines the logical volume, the physical memory region is not assigned to each virtual page. The storage controller 102 assigns the physical memory region to the virtual page only when a write request to the virtual page is received from the host computer 103. The physical memory region assigned to the virtual page is called the actual page. FIG. 2 illustrates a state where an actual page 203A is assigned to the virtual page #0 (202a).

The actual page is a region which is formed using the memory region of a plurality of flash volumes of the RG 204. FIG. 2 illustrates flash volumes 115A to 115E of the FMPKGs 113A to 113E. The RAID type of the RG 204 illustrated in FIG. 2 is a 3D+1P configuration of RAID 4 (the RAID group which is configured by three data drives and one parity drive).

In this embodiment, the RAID is configured by the FMPKGs 113A to 113E. The flash volume 115A (the FMPKG 113A) is a preliminary FMPKG which stores the data stored in the failed FMPKG when one FMPKG of the RG 204 is failed and secures a redundancy of the data stored in the RG 204.

The storage controller 102 divides the flash volumes 115A to 115E of the FMPKGs 113A to 113E belonging to the RG 204 into a plurality of memory regions having a fixed size called a stripe block, and manages the flash volumes. For example, in FIG. 2, the regions denoted with 0(D), 1(D), 2(D), and so on, or P0, P1, and so on indicate the stripe blocks.

In this embodiment, the size of the stripe block is set to be equal to the size of a virtual segment of the flash volume. Otherwise, the sizes of the stripe block and the virtual segment may be differently configured.

Figure 2:
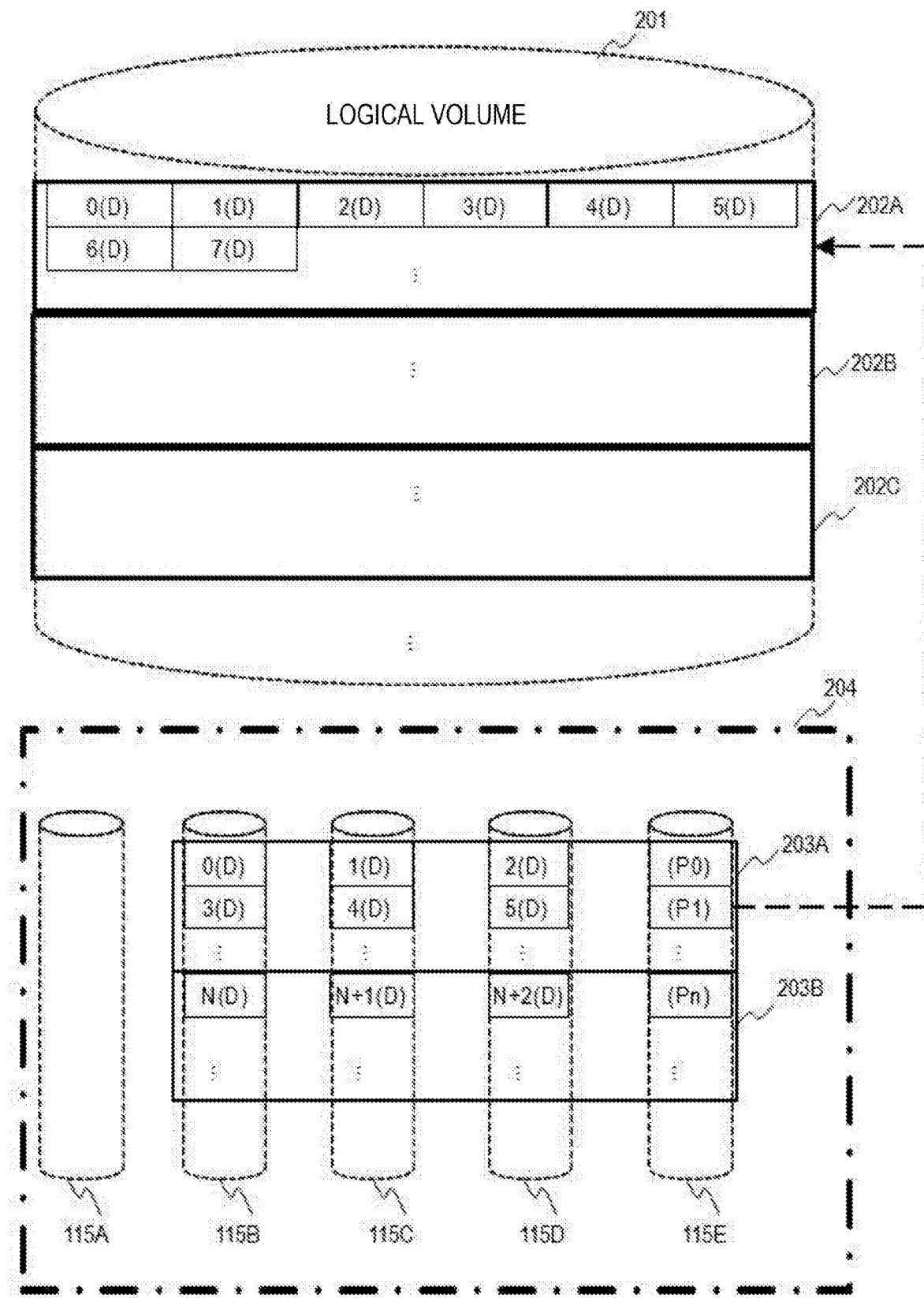
FIG. 2 is a diagram illustrating a RAID configuration which is used by a storage system.

In FIG. 2, the stripe blocks denoted with P0, P1, and so on in the stripe blocks are the stripe blocks which store redundancy data (parity) generated by a RAID function, and are called "parity stripe blocks". On the other hand, the stripe blocks denoted with 0(D), 1(D), 2(D), and so on are the stripe blocks which store data (other than the redundancy data) written from the host computer 103. The stripe block is called a "data stripe block". The parity stripe block stores the redundancy data which is generated using a plurality of data stripe blocks.

Hereinafter, a set of the parity stripe block and the data stripe block used to generate the redundancy data stored in the parity stripe block is called a "stripe line". In the case of the storage system 101 according to this embodiment, for example, the parity stripe block P0 stores the redundancy data (parity) which is generated using the data stripe blocks 0(D), 1(D), and 2(D). The data stripe blocks 0(D), 1(D), and 2(D) and the parity stripe block P0 belong to the same stripe line.

In other words, each stripe block belonging to one stripe line exists at the same position (address) on the flash volumes 115B to 115E. However, as another embodiment, the stripe blocks belonging to the same stripe line may exist in different addresses on the flash volume. In the storage system 101 according to this embodiment, the actual page (for example, 203A and 203B) is configured by one or more stripe lines as illustrated in FIG. 2.

In a case where the actual page is assigned to the virtual page, only the data stripe blocks (0(D), 1(D), etc.) are assigned, but the parity stripe block is not assigned. Therefore, a total size of the region where the write data on the actual page is equal to the size of the virtual page. In other words, a relation of (Size of Actual Page–Size of Parity Storage Region)=Virtual Page Size is established. FIG. 2 illustrates an exemplary configuration of RAID 4. For example, in a case where the RAID type of the RG 204 is RAID 1, the actual page size is two times the virtual page size.

A relation (mapping) between the region in the virtual page and the region in the actual page is illustrated in FIG. 2. In other words, the regions (0(D), 1(D), and 2(D)) excluding the parity from the stripe line of the head of the actual page is assigned to the head region of the virtual page. Then, similarly, the regions (3(D), 4(D), 5(D), and so on) excluding the parity from each of the second and subsequent stripe lines of the second actual page are sequentially assigned to the region of the virtual page.

The storage system 101 obtains the virtual page number and the relative address in the virtual page (the offset address from the head of the virtual page) from the access position (LBA) on the logical volume which is designated by the access request from the host computer 103. As described above, the region in the virtual page and the region in the actual page are regularly mapped. Therefore, the storage system 101 can uniquely calculate the FMPKG 113 associated to the access position in the virtual page and the region (data stripe block) in the FMPKG 113.

Further, in addition to the data stripe block associated to the access position, the parity stripe block belonging to the same stripe line as the data stripe block can be uniquely determined.

Further, the mapping between the region in the virtual page and the region in the actual page is not limited to the above mapping method. In a capacity virtualization technology, a total memory capacity of each logical volume can be defined to be larger than the capacity of the actual memory medium when each logical volume is defined. Therefore, in general, the number of virtual pages is larger than the number of actual pages. The storage system according to this embodiment can also define the number of virtual pages to be larger than the number of actual pages.

The actual page assigned to each virtual page in the logical volume is not necessarily limited to the actual page in the same FMPKG 113. The actual page assigned to the virtual page #0 and the actual page assigned to the virtual page #1 may be the actual pages in different RGs 204. However, in this embodiment, all the actual pages to be assigned to the virtual page of one logical volume will be described about an example in which the RAID types are assigned from the same RG 204.

Figure 3:
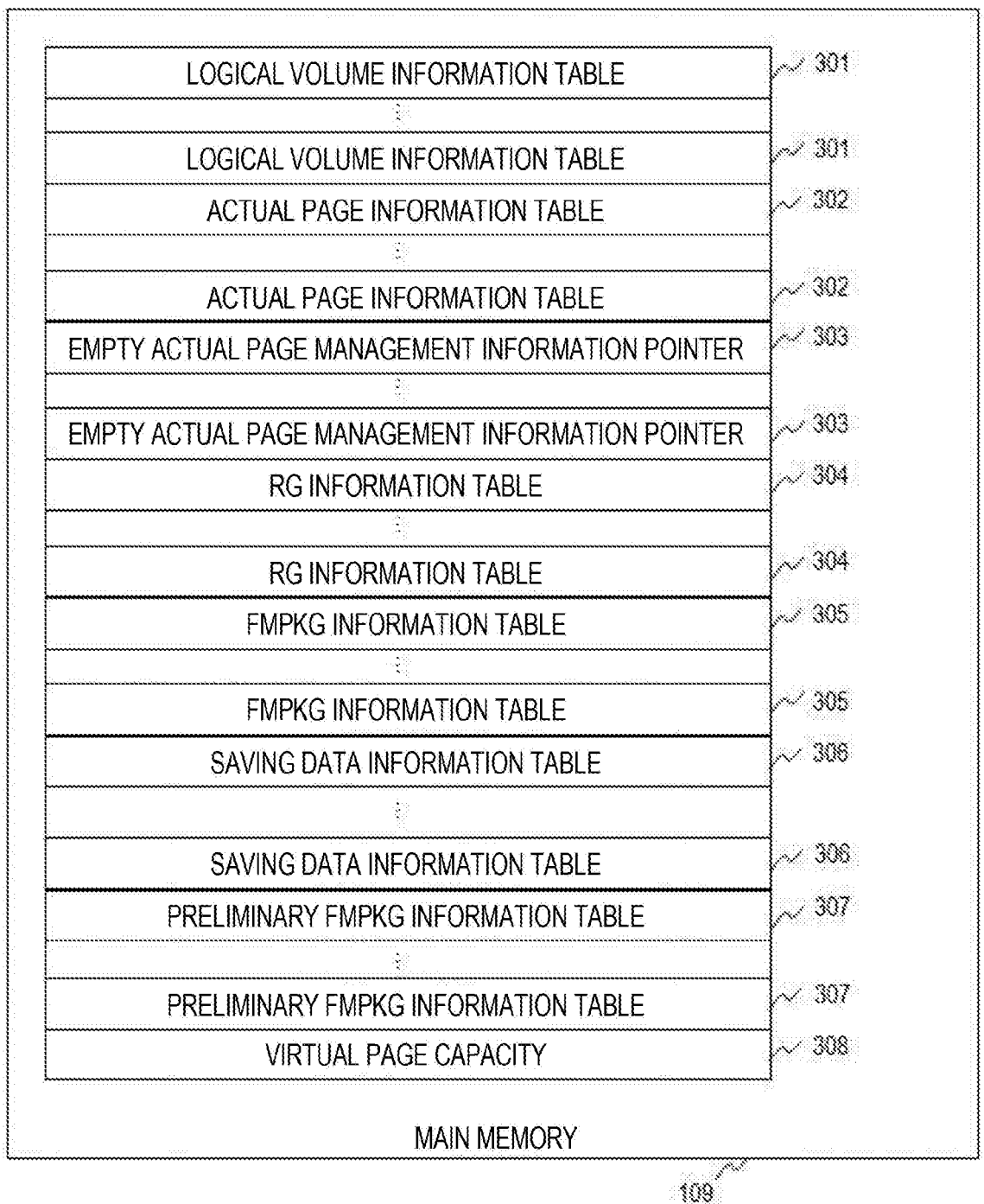
FIG. 3 is a diagram illustrating information which is referred by the storage system.

Subsequently, the description will be given about the information which is managed by the storage system 101 in this embodiment. FIG. 3 illustrates information related to this embodiment in the information stored in the main memory 109 of the storage system 101. The main memory 109 stores, at least, a logical volume information table 301, an actual page information table 302, an empty actual page management information pointer 303, a RAID group information table 304, an FMPKG information table 305, a data saving address table 306, a preliminary FMPKG information table 307, and the virtual page capacity 308.

Figure 4:
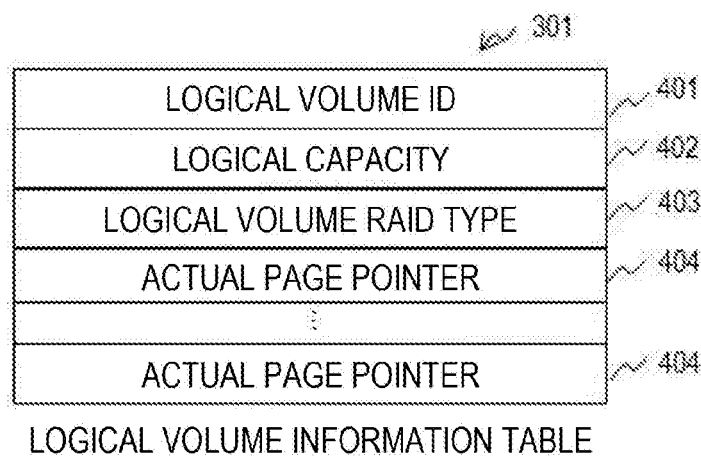
FIG. 4 is a diagram illustrating a format of a logical volume information table.

Hereinafter, the description will be given specifically. FIG. 4 illustrates the format of the logical volume information table 301. The logical volume information table 301 is prepared for each logical volume, and manages attribute information of the logical volume. Hereinafter, the logical volume of which the attribute information is managed by a certain logical volume information table 301 is called a "management target logical volume". The logical volume information table 301 includes a logical volume ID 401, a logical capacity 402, a logical volume RAID type 403, and an actual page pointer 404.

The logical volume ID 401 indicates the ID of the management target logical volume. In general, the host computer 103 designates an identifier of the logical volume (for example, Logical Unit Number (LUN)), an address (LBA) in the logical volume, and an access destination data length, and issues the access request (read request or write request). The logical volume ID 401 stores the identifier of the logical volume which is designated when the host computer 103 issues the access request to the logical volume.

The logical capacity 402 indicates the capacity of the management target logical volume. The logical volume RAID type 403 indicates the RAID type of the management target logical volume. The information contained in the logical volume RAID type 403 includes a numerical value indicating N in a case where the redundancy data of one memory drive is stored for N memory drives other than the RAID types such as RAID 0 and RAID 1.

The designated RAID type is a RAID type of at least one RG 204. When the actual page is assigned to the virtual page of the management target logical volume, the storage controller 102 selects the actual page from the RG 204 where the RAID type of the RG 204 is the same as the logical volume RAID type 403.

The actual page pointer 404 is a pointer pointing to page management information (the actual page information table 302 described below) of the actual page assigned to the virtual page of the management target logical volume. The number of actual page pointers 404 is the number of virtual pages of the management target logical volume (the number is obtained by dividing the logical capacity 402 by the virtual page capacity 308 but, if a remainder comes, added with "1"). If the number of the virtual pages of the management target logical volume is "n", there are "n" actual page pointers 404.

The k-th actual page pointer from the head among the plurality of actual page pointers 404 in the logical volume information table 301 is a pointer pointing to the page management information (the actual page information table 302 described below) of the actual page assigned to the virtual page #(k−1). In addition, a trigger to assign the actual page is not a time when the logical volume is defined, but a time when an actual request of writing data to the virtual page is received. The actual page pointer 404 corresponding to the virtual page to which the writing is not yet performed is set to an invalid value (NULL).

Figure 5:
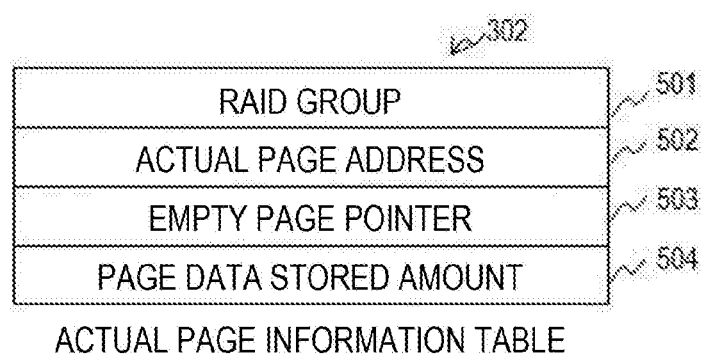
FIG. 5 is a diagram illustrating a format of an actual page information table.

FIG. 5 illustrates the format of the actual page information table 302. The actual page information table 302 manages the information of the actual page. Therefore, there is one actual page information table 302 for each actual page. The actual page information table 302 includes a RAID group 501, an actual page address 502, an empty page pointer 503, and a page data stored amount 504. Further, in the process of describing the actual page information table 302 below, the actual page managed by a certain actual page information table 302 is called a "management target actual page".

The RG 501 indicates an identifier of the RG to which the management target actual page belongs. Hereinafter, the identifier of the RG is called an "RGID". The actual page address 502 contains information of a position (address) where the management target actual page exists. The address indicating the actual page address 502 is a relative address in the RG 204 to which the management target actual page belongs.

The empty page pointer 503 is used in a case where the management target actual page is not assigned to the virtual page. In this embodiment, the actual page which is not assigned to the virtual page is called an "empty actual page" or "empty page". In a case where the management target actual page is not assigned to the virtual page, the empty page pointer 503 points to the actual page information table 302 of another empty page. In a case where the management target actual page is assigned to the virtual page, the empty page pointer 503 is a NULL value.

The page data stored amount 504 indicates a data amount which is stored in the management target actual page. The information is not the attribute information related to the FMPKG 113 (the memory region thereof) assigned to the management target actual page, but the attribute information related to the data of the virtual page to which the management target actual page is assigned. Therefore, in a case where another actual page is assigned to the virtual page, and the data of the current actual page is copied to a new actual page, the value of the page data stored amount 504 is necessarily taken over as the management information of the new actual page.

FIG. 6 illustrates the format of an RG information table 304. The RG information table 304 is used to manage the information of the RG 204. One RG information table 304 exists for one RF 204. The RG information table 304 includes an RG ID 601, an RG RAID type 602, the number of actual pages 603, the number of empty actual pages 604, and an FMPKG pointer 605. Hereinafter, the RG 204 managed by a certain RG information table 304 is called a "management target RG".

The RG ID 601 indicates an identifier of the management target RG. The RG RAID type 602 indicates a RAID type of the management target RG. The RAID type is the same as described in the logical volume RAID type 403. The number of actual pages 603 and the number of empty actual pages 604 indicate the number of total actual pages of the management target RG and the number of empty actual pages respectively.

The FMPKG pointer 605 indicates a package ID of the FMPKG 113 which belongs to the management target RG. The number of FMPKG pointers 605 contained in the RG information table 304 is equal to the number of FMPKGs 113 which belongs to the management target RG. In addition, the number is a value determined by the RG RAID type 602.

FIG. 7 illustrates the format of the FMPKG information table 305. The FMPKG information table 305 contains an FMPKG ID 701, an FMPKG virtual capacity 702, and a block capacity 703 which are information to manage the FMPKG 113. The FMPKG information table 305 exists in every FMPKG. Hereinafter, the FMPKG managed by a certain FMPKG information table is called a management target FMPKG.

The FMPKG ID 701 is an identifier (referred to as a package ID) of the management target FMPKG 113. The FMPKG virtual capacity 702 indicates the size of the region which is provided to the storage controller 102 among the memory regions of the flash volume where the management target FMPKG 113 is formed. In this embodiment, the size is called as a "virtual capacity".

FIG. 8 illustrates the format of the data saving address table 306. The data saving address table 306 includes an area number 801, a saving flag 802, and a saving destination FMPKG ID 803 which are information to manage the FMPKG 113. The data saving address table 306 exists in every FMPKG. Hereinafter, the FMPKG managed by a certain data saving address table is called a management target FMPKG.

The area number 801 is a unique ID assigned to each region which is obtained by dividing the address space of the management target FMPKG into a predetermined size of the regions. The area is a unit of data to be saved in another FMPKG. One area corresponds to integer times the stripe block for example. For example, when the size of the stripe block is 16 kB, the area size is 16 MB. It is possible to appropriately suppress the degradation of the I/O function after data saving by appropriately selecting the size of the area. The saving flag 802 indicates whether the data stored in the corresponding area number 801 is saved in the saving destination FMPKG 113 in the management target FMPKG.

The saving destination FMPKG ID 803 indicates the saving destination FMPKG 113 of the corresponding area number 801 in the management target FMPKG. In a case where there is no saving destination FMPKG 113, the saving destination FMPKG ID 803 is an invalid value (NULL).

FIG. 9 illustrates the format of the preliminary FMPKG information table 307. The preliminary FMPKG information table 307 contains a preliminary FMPKG ID 901, an area number 903, a saving flag 904, a saving source FMPKG ID 905, and an available capacity 902 which are information to manage the preliminary FMPKG 113. The preliminary FMPKG information table 307 exists as many as the number of FMPKGs 113 which do not belong to any RG 204. Hereinafter, the FMPKG managed by a certain preliminary FMPKG information is called a management target preliminary FMPKG.

The preliminary FMPKG ID 901 indicates an identifier (referred to as a preliminary package ID) of the management target preliminary FMPKG. The area number 903 indicates a unique ID assigned to each region which is obtained by dividing the address space of the management target preliminary FMPKG into a predetermined size of the regions. The saving flag 904 is an entry indicating whether data is saved in the corresponding area in the management target preliminary FMPKG.

The saving source FMPKG ID 905 stores the saving source FMPKG ID in a case where the data of the corresponding area in the management target preliminary FMPKG is saved. In addition, the available capacity 902 indicates a writable capacity of the management target preliminary FMPKG. In other words, a value obtained by subtracting the saving data capacity from the logical capacity of the management target preliminary FMPKG is saved.

FIG. 10 illustrates the format of a failure notification 1001 which is notified from the FMPKG 113 to a host device 112. The failure notification 1001 contains a request type 1002, a lost data capacity 1003, and lost data information 1004.

The request type 1002 indicates a type of a data recovery process which is requested to the host device by the FMPKG 113. The lost data capacity 1003 indicates the lost data capacity which is lost at the time of the partial failure of the FMPKG 113. The lost data information 1004 indicates an address related to the lost data and length information.

Figure 11:
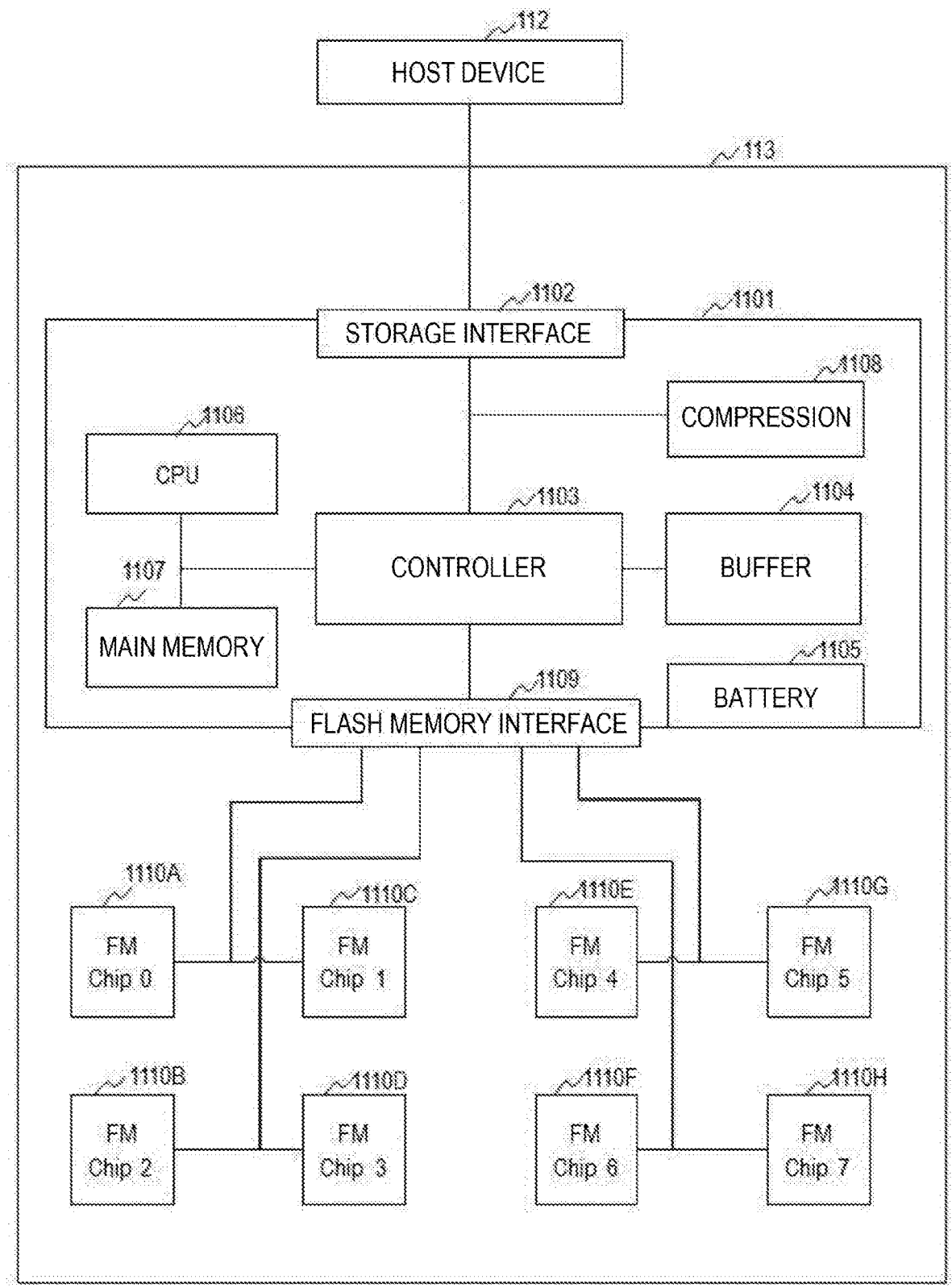
FIG. 11 is a diagram illustrating a configuration of a flash memory package.

Hereinafter, the configuration of the FMPKG 113 will be described using FIG. 11. Further, the basic configurations of the plurality of FMPKGs 113 are equal. The FMPKG 113 includes a controller unit 1101 and a plurality of FM chips 1110A to 1110H. The FM chip 1110 means one or more FM chips in the FM chips 1110A to 1110H.

The controller unit 1101 includes a CPU 1106, a main memory 1107, a controller 1103, a compression circuit 1108, a buffer 1104, and a battery 1105. The components in the controller unit 1101 are connected through a bus. The main memory 1107 includes a region to store a program for controlling the FMPKG 113 and a region to temporally store data. The CPU 1106 operates as a predetermined functional unit according to the program stored in the main memory 1107, and controls the FMPKG 113.

The buffer 1104 is a cache memory which temporally stores data. The battery 1105 supplies power to store the data of the volatile main memory 1107 and the buffer 1104 to the nonvolatile FM chips 1110A to 1110H when the power to the FMPKG 113 is disconnected.

A storage interface 1102 is an interface to communicate with the host device 112. The controller unit 1101 is connected to the host device 112 through the storage interface 1102. The host device 112 is, for example, the host computer 103 or the storage controller 102.

A flash memory interface 1109 is an interface to communicate with the FM chips 1110A to 1110H. The controller unit 1101 and the FM chips 1110A to 1110H are connected through the flash memory interface 1109.

The controller unit 1101 provides the logical address space of the FMPKG 113 to the host device 112. In the logical address space, the physical memory region in the FMPKG 113 is associated. The physical memory region corresponding to the logical memory space provided to the outside of the FMPKG 113 is called a user region.

The logical address space is divided by a predetermined size of logical segments in the FMPKG 113. When receiving the read/write request designating the logical address from the host device 112, the controller unit 1101 specifies a physical segment from the logical address and performs the reading/writing of data. In addition, a failure which partially occurs in the FMPKG 113 is managed.

The physical memory region of the flash memory includes a plurality of blocks. Each block includes a plurality of physical segments (simply referred to as segments). The block is a unit of erasing data, and the segment is a unit of writing and reading data. In other words, the controller unit 1101 controls the erasing of data in a unit of block, and the writing/reading of data in a unit of segment.

In addition, the flash memory has a characteristic that data is not overwritten. Therefore, if the controller unit 1101 receives data to update (update data) the data stored in a certain segment, the controller unit 1101 writes the update data in an empty segment which does not store data. Then, a correspondence relation between the logical segment and the physical segment before the updating is changed to a correspondence relation between the logical segment and the physical segment after the updating. Therefore, the host device 112 is not necessary to change the logical address of the access destination.

The controller unit 1101 manages the data before the updating as invalid data, and the data after the updating as valid data. When the invalid data is erased, the segment where the invalid data is stored becomes an empty segment, and can store data. The erasing is performed in a unit of block. In a case where the valid data and the invalid data are mixed in a block, the controller unit 1101 copies the valid data to another empty segment, and erases the data in the block. The process of copying the valid data and erasing the block is called a garbage collection.

In this way, in a case where there is no empty segment in the flash memory, new data is not possible to be written if the data is erased in a unit of block. In addition, when the erasing is performed, data is not possible to be written until the erasing is ended. Therefore, the writing performance is lowered, and the performance is also lowered due to the overhead of the erasing. Therefore, the memory drive having the flash memory as a memory medium is provided with a region (update region) to write the update data.

Further, there is no need to physically separate the user region from the update region. For example, in a case where a certain block is used as the user region and erased, the block may be not used as the update region next.

Figure 12:
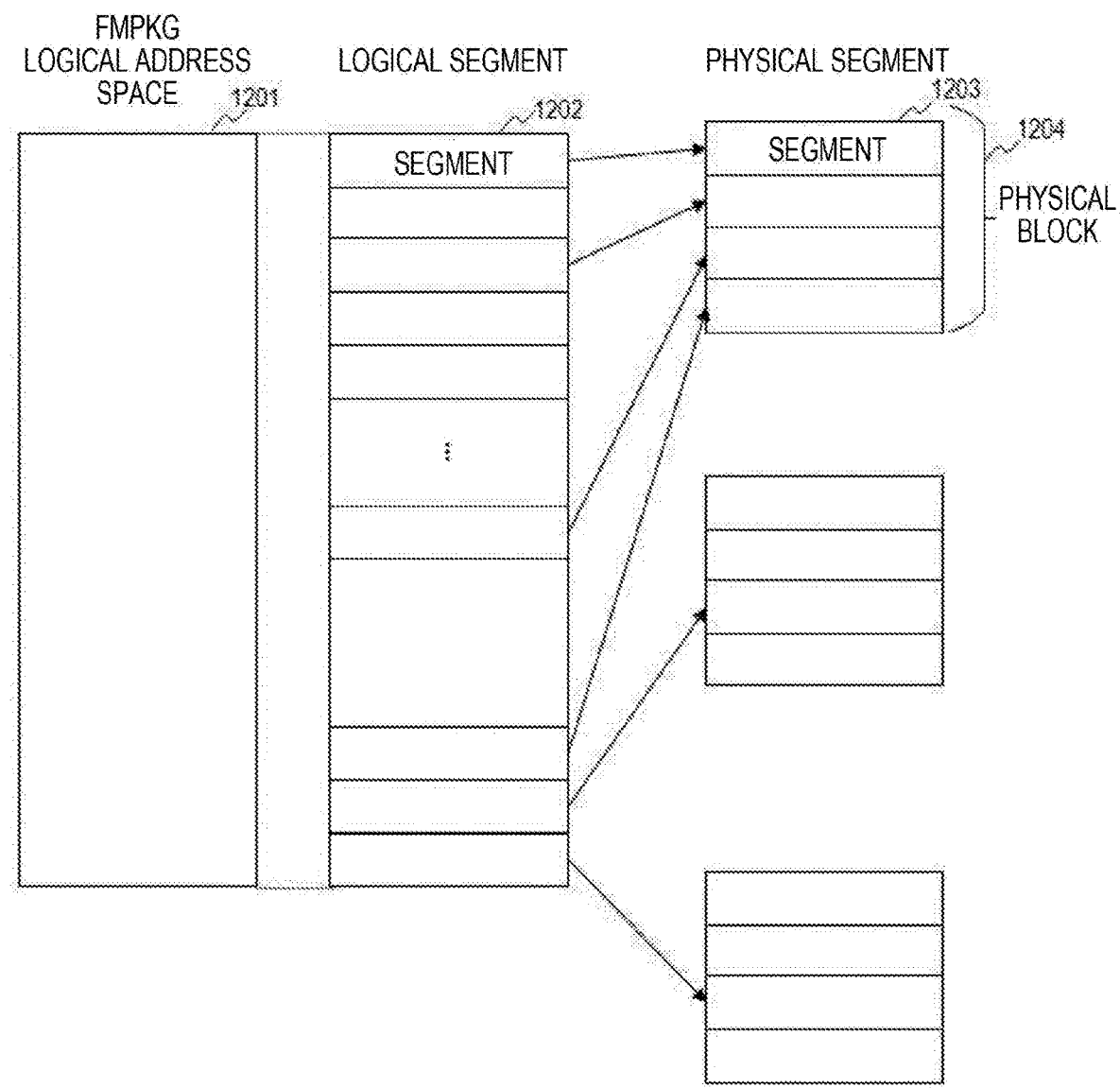
FIG. 12 is a diagram illustrating a configuration of a logical segment and a physical segment of the flash memory package.

FIG. 12 illustrates a configuration of the logical segment and the physical segment of the FMPKG 113. The controller unit 1101 provides a logical address space 1201 to the host device 112, and divides the logical address space 1201 into the predetermined logical segments 1202 (for example, 8 kB) and manages the space.

The controller unit 1101 divides the block into the predetermined physical segments 1203 (for example, 8 kB) and manages the block. The controller unit 1101 assigns the physical segment 1203 to the logical segment 1202.

A block 1204 is configured to include a predetermined number (for example, 256) of physical segments 1203. The controller unit 1101 performs the writing data on an FM chip 1110 in a unit of the physical segment 1203, and performs the erasing on the FM chip 1110 in a unit of the block 1204. Hereinafter, the logical address is called LBA.

FIG. 13 illustrates information which is stored in the main memory 1107 of the controller unit 1101. The main memory 1107 stores a logical-physical conversion program 1301, a logical-physical conversion information table 1302, a data transfer controller controlling program 1303, an input/output controller controlling program 1304, an operating system 1305, a flash storage controlling program 1306, and an FM management information table 1307. The CPU 1106 controls the FMPKG 113 according to the flash storage controlling program 1306.

FIG. 14 illustrates the format of the logical-physical conversion information table 1302. The logical-physical conversion information table 1302 includes an entry of the logical segment. The entry of the logical segment includes an LBA 1401 which indicates the head of the logical segment, a logical segment identifier 1402 which indicates the logical segment, and a physical segment identifier 1403 which indicates the physical segment assigned to the logical segment.

In a case where the physical segment is not assigned to the logical segment, the physical segment identifier 1403 indicates an unassigned state. The physical segment identifier indicates, for example, a combination of a chip number which indicates a position of a chip in the FMPKG 113, a die number which indicates a position of a die in the chip, a block number which indicates a position of a block in the die, a word line number which indicates a position of a word line in the block, and a segment number which indicates a position of the physical segment in the block.

Further, the main memory 1107 stores relevant information which indicates an association between the unique physical segment identifier in the FMPKG 113, the chip number, the die number, the block number, the word line number, and the segment number. The controller unit 1101 may specify the chip number, the die number, the block number, the word line number, and the segment number from the physical segment identifier on the basis of the relevant information.

Figure 15:
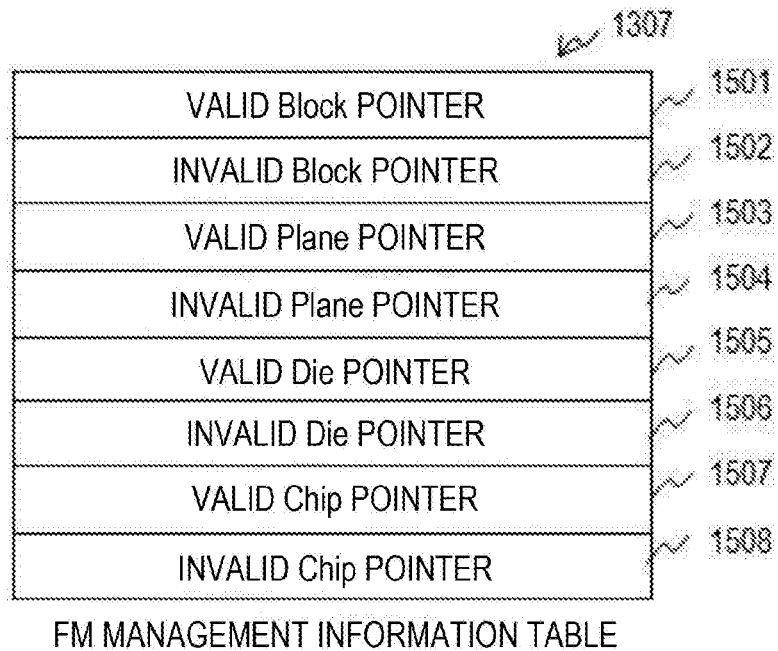
FIG. 15 is a diagram illustrating a format of an FM management information table.

FIG. 15 illustrates the FM management information table 1307. The FM management information table 1307 manages an available resource in the FMPKG 113. The FM management information table 1307 includes a valid block pointer 1501, an invalid block pointer 1502, a valid plane pointer 1503, an invalid plane pointer 1504, a valid die pointer 1505, an invalid die pointer 1506, a valid chip pointer 1507, and an invalid chip pointer 1508.

The valid block pointer 1501 indicates the block number which can be used as a data storage destination by the controller unit 1101. The invalid block pointer 1502 indicates the block number which cannot be used for storing data due to a life span or a failure.

The valid plane pointer 1503 indicates the plane number which can be used as a data storage destination by the controller unit 1101.

The invalid plane pointer 1504 indicates the plane number which cannot be used for storing data due to a life span or a failure.

The valid die pointer 1505 indicates the die number which can be used as a data storage destination by the controller unit 1101. The invalid die pointer 1506 indicates the die number which cannot be used for storing data due to a life span or a failure.

The valid chip pointer 1507 indicates the chip number which can be used as a data storage destination by the controller unit 1101. The invalid chip pointer 1508 indicates the chip number of chip which cannot be used for storing data due to a life span or a failure.

If a failure occurs in the physical memory region of the FMPKG 113, the data stored in the physical memory region is lost. The controller unit 1101 is not possible to restore the lost data. Therefore, the controller unit 1101 specifies the logical address region corresponding to the physical memory region where the failure occurs, and notifies the host device 112. The host device 112 can restore the lost data from the data of the other FMPKG 113 of the RG.

However, the FMPKG 113 in which a failure occurs partially may be insufficient in the empty region to store the restored data because the physical memory region is reduced due to the failure. Thus, the storage system 101 saves the data of the continuous logical address region in the preliminary FMPKG 113 to restore the data after the physical memory region to store the restored data is secured in the partial failure FMPKG 113. The saved data amount is equal to or more than the region which is insufficient for storing the restored data. For example, the data amount may be equal or more than a total amount of data to be restored.

The storage system 101 switches the access to the saved data to the preliminary FMPKG 113, and the access to the other data to the partial failure FMPKG 113. Since the data of the continuous logical address region is saved in the preliminary FMPKG 113, the redundancy of the data can be restored without causing the degradation of sequential access performance compared to a case where the data of the discrete logical address corresponding to the failed region is saved in the preliminary FMPKG 113.

Figure 16:
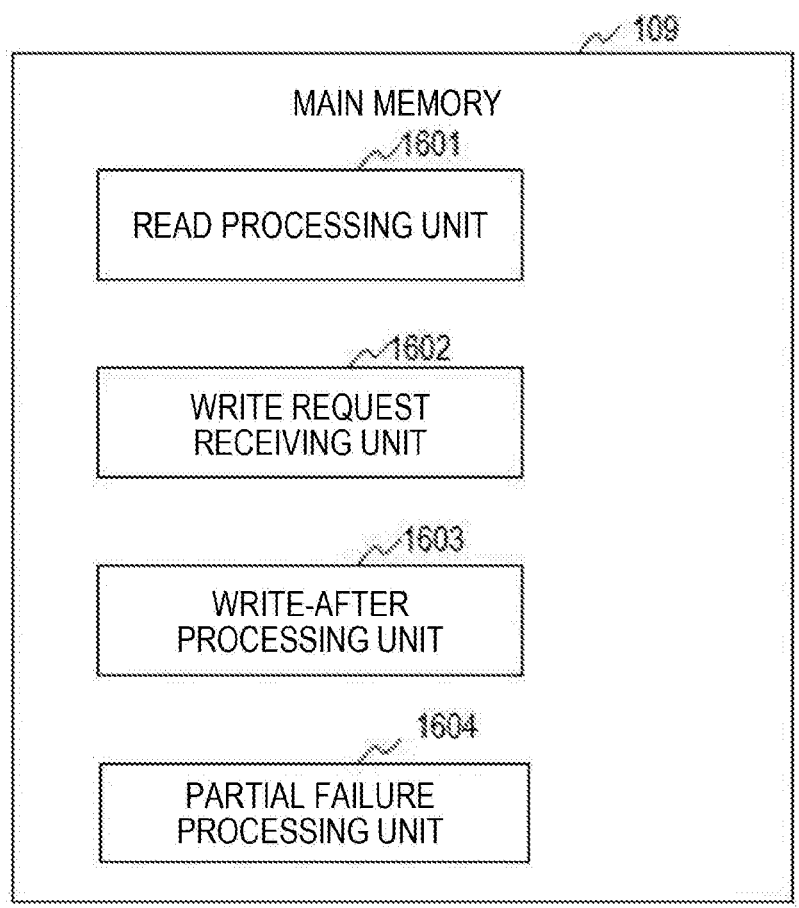
FIG. 16 is a diagram illustrating a configuration of a program which is stored in a memory of the storage system.

Next, the processes of the storage controller 102 and the FMPKG 113 will be described using the management information. First, the process performed by the storage controller 102 will be described. Further, the process performed by the storage controller 102 is realized by the processor 108 which performs a program in the storage controller 102 in principle. In addition, the program is stored in the main memory 109. FIG. 16 illustrates a program related to this embodiment which is stored in the main memory 109.

The program related to this embodiment includes a read processing unit 1601, a write request receiving unit 1602, a write-after processing unit 1603, and a partial failure processing unit 1604. These programs realize a wear leveling technology of a higher level and the capacity virtualization technology. Further, in the following description, the description of a process using the program (the read processing unit 1601, etc.) as a subject means that the program (the read processing unit 1601, etc.) is performed by the CPU 108 to perform the process.

Further, as described above, in the storage system 101 according to this embodiment, the FMPKG 113 performs the wear leveling function and the capacity virtualization function of a lower level. However, in another embodiment, the wear leveling function and the capacity virtualization function may be performed by the storage controller 102. In this case, the program for realizing the wear leveling function and the capacity virtualization function is performed by the storage controller 102.

Since the program of the higher level (the program to realize the capacity virtualization function of the higher level) and the program of the lower level both are performed by the storage controller 102, the interface between the programs is different. However, basically there is no big difference in the content performed by the program of the higher level.

This embodiment will be described in detail about a processing flow of the read processing unit 1601, the write request receiving unit 1602, the write-after processing unit 1603, and the partial failure processing unit 1604 on an assumption that the wear leveling technology of the lower level and the capacity virtualization technology are performed by the FMPKG 113.

In this embodiment, it is assumed that a data access range which is designated by the read request or the write request from the host computer 103 is matched to a virtual segment boundary which is a unit of reading/writing the flash memory. Even in a case where the access range designated from the host computer 103 is not matched with the virtual segment boundary, the logical volume can be accessed. For example, in a case where a partial region of the virtual segment is designated to a write region, the FMPKG 113 reads out the entire virtual segment, updates only the designated partial region, and writes the entire virtual segment.

<Failure Detection of Storage Controller>

Figure 17:
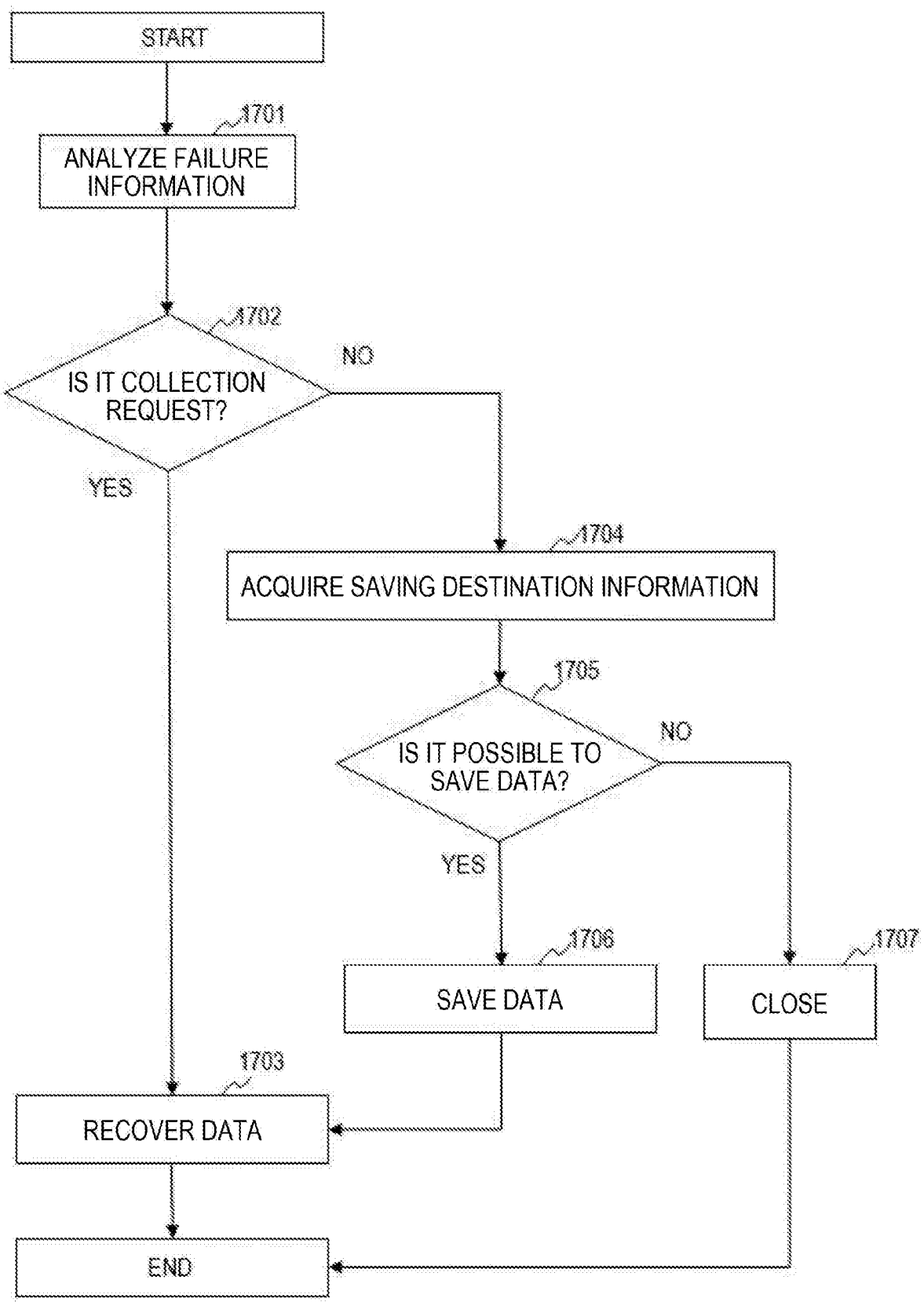
FIG. 17 is a diagram illustrating a processing flow of a partial failure processing unit.

FIG. 17 illustrates a flow that the partial failure processing unit 1604 detects a failure of the FMPKG 113. This flow is performed in a case where a certain FMPKG 113 detects a partial failure occurs. Hereinafter, the FMPKG 113 which detects a failure is called the partial failure FMPKG 113. In addition, the lost data lost caused by the failure is called lost data, and the logical address of the lost data is called a lost data address.

In Step 1701, the partial failure processing unit 1604 receives failure information from the failed FMPKG 113.

The failure information received by the partial failure processing unit 1604 includes the lost data address, a size, and a collection type.

In Step 1702, the partial failure processing unit 1604 received the failure information first determines the content of the process with reference to the collection type information. In a case where the collection type information is a collection request (1702: YES), the partial failure processing unit 1604 performs Step 1703.

In Step 1703, the partial failure processing unit 1604 performs the data recovery process on the partial failure FPMPKG 113 at the lost data address received in Step 1701. The data recovery process recovers the data associated with the notified address by a RAID mechanism, and writes back to the partial failure FMPKG 113. With this configuration, the lost data is recovered, and the redundancy of the data is recovered.

In a case where the collection data type is not the collection request (that is, the case of a request for saving data to the other drive) (1702: NO), the partial failure processing unit 1604 selects a predetermined preliminary FMPKG 113 from the preliminary FMPKG 113 registered in the preliminary FMPKG information table 307 as a saving destination in Step 1704, and acquires the available capacity with reference to the available capacity 902 of the preliminary FMPKG information table 307. A method of selecting a saving destination will be described below with reference to FIG. 18.

The plurality of FMPKGs 113 may be selected as the saving destination FMPKG 113. However, in this embodiment, the description will be given about the case of one preliminary FMPKG 113. Hereinafter, the FMPKG 113 of the saving destination is called as the saving destination FMPKG 113, the data to be saved to the saving destination FMPKG 113 is called the saving data, and the logical address of the saving data is called a saving data address.

In Step 1705, the partial failure processing unit 1604 compares the available capacity of the saving destination which is acquired in Step 1704 and the saving data amount which is acquired in Step 1701. In a case where the saving data amount is small (1705: YES), the partial failure processing unit 1604 performs the saving process of data in Step 1706. The processing content will be described below. After Step 1706 is completed, the host device 112 performs Step 1703 on the partial failure FMPKG 113.

On the other hand, in a case where the saving data amount is larger (1705: NO), the data of the failed FMPKG 113 is not possible to be saved. Therefore, the partial failure processing unit 1604 closes the partial failure FMPKG 113 in Step 1707, and urges the replacement of the FMPKG 113.

<Data Saving>

Figure 18:
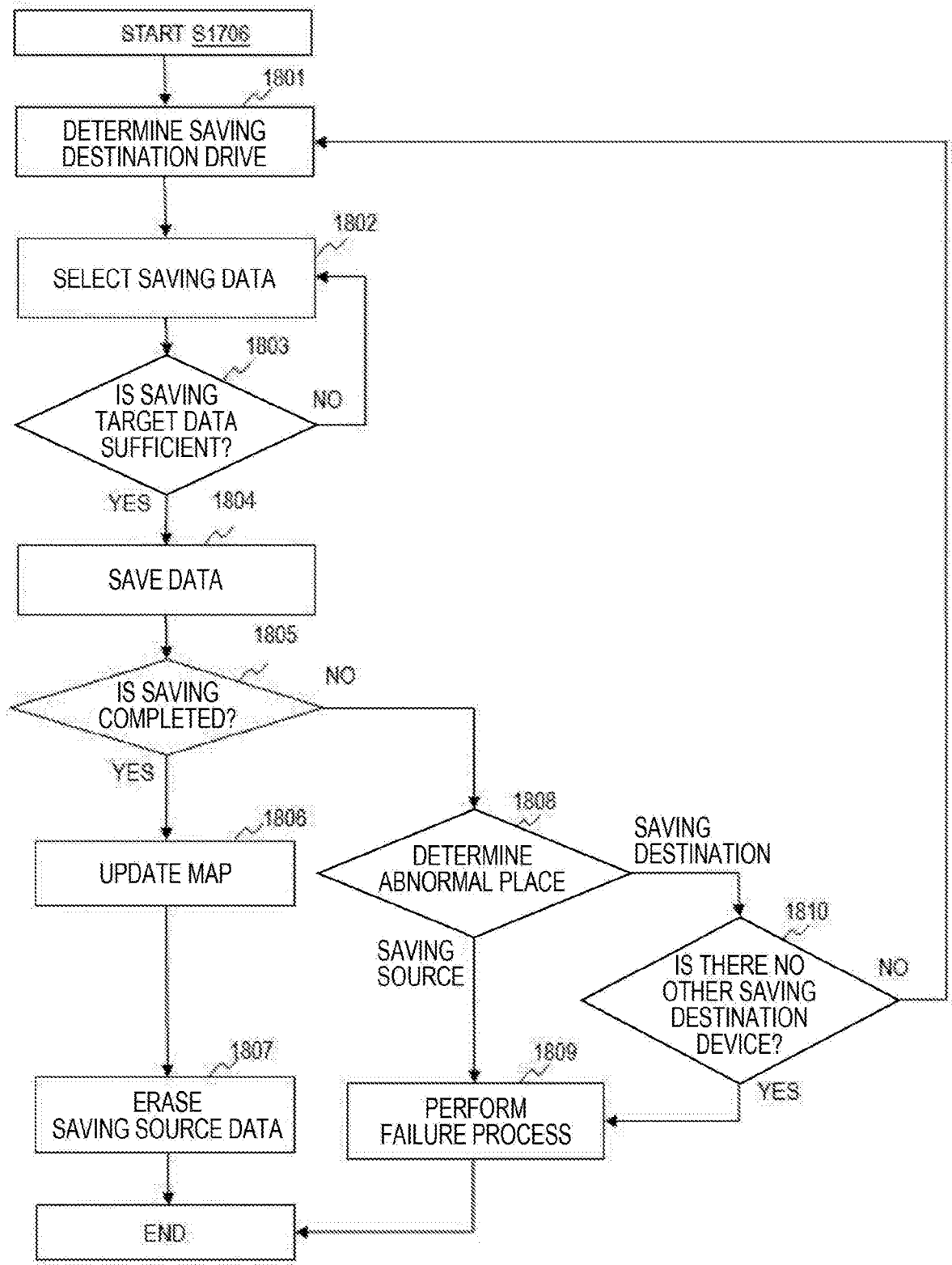
FIG. 18 is a diagram illustrating a flow of a data saving process.

Next, the details of a data saving process (1706) will be described using FIG. 18. In Step 1801, the partial failure processing unit 1604 determines the ID of the saving destination FMPKG 113. In a case where there are a plurality of preliminary FMPKGs 113, the partial failure processing unit 1604 selects one of the FMPKGs. In a case where there is a FMPKG 113 used as the saving destination FMPKG 113, the partial failure processing unit 1604 selects that FMPKG 113.

In Step 1802, the partial failure processing unit 1604 determines the saving data using the ID of the failed FMPKG 113 acquired in Step 1701 and the data saving address table 306. Specifically, the partial failure processing unit 1604 retrieves an area number indicating "No saving" in both of the saving flag 802 stored in the data saving address table 306 and the saving flag 904 of the preliminary FMPKG information table 307 of the preliminary FMPKG 113. According to the examples illustrated in FIGS. 8 and 9, Area 1 is selected. With the saving of data in a unit of area, it is possible to suppress the degradation of the I/O performance thereafter.

In a case where the data amount of the saving data selected in Step 1802 is equal to or more than the lost data amount (1803: Yes), Step 1804 is performed. In a case where the data amount of the saving data selected in Step 1801 is smaller than the lost data amount (1803: No), the partial failure processing unit 1604 performs Step 1802 to try the selection of the saving data again. This process is repeatedly performed until the saving data having a larger amount than the lost data is selected. The selected area numbers (addresses) may be discontinuous, or may be continuous.

Further, in the above example, the data of one failed FMPKG 113 is saved in one saving destination FMPKG 113. However, a plurality of the failed FMPKGs 113 may share one saving destination FMPKG 113. On the contrary, a plurality of the saving destination FMPKGs 113 may be used with respect to one failed FMPKG 113.

In Step 1804, the partial failure processing unit 1604 performs copying of the saving data to the saving destination FMPKG 113 on the basis of the saving data acquired in Step 1801 and the information of the saving destination FMPKG 113. In a case where the lost data is contained in the saving data, the lost data is restored by the RAID mechanism, and stored in the saving destination FMPKG 113. With this configuration, the lost data can be transferred to the other FMPKG 113, and the saving data can be selected regardless of the logical address of the lost data.

The partial failure processing unit 1604 associates the LBA of the saving destination FMPKG 113 with the saving data to make the saving data equal to the associated LBA in the partial failure FMPKG. With this configuration, the stripe line of the RAID is not necessary to be established again.

In a case where the data saving is completed after Step 1804 (1805: YES), the partial failure processing unit 1604 updates the entry of the area number corresponding to the saving data with respect to the data saving address table 306 and the preliminary FMPKG information table 307 in Step 1806.

As described above, in a case where an area number 1 is selected as the saving data, the partial failure processing unit 1604 updates the saving flag 802 and the saving flag 904 to "save" with respect to the entry of the area number 1, and stores the ID of the saving destination FMPKG 113 to the saving destination FMPKG ID 803 and the ID of the partial failure FMPKG to the saving source FMPKG ID 905. In addition, the value of the available capacity 902 is updated.

In this process, the access to the saving data by the host device 112 is issued to the saving destination FMPKG 113. The details of the access process to the saving data will be described below. After Step 1806, Step 1807 is performed. In Step 1807, the partial failure processing unit 1604 erases the saving data from the partial failure FMPKG 113. With this process, the unused physical segments in the partial failure FMPKG 113 are increased. Therefore, the lost data can be stored.

In Step 1805, in a case where there occurs an abnormality in any one of the saving destination FMPKG 113 and the partial failure FMPKG 113, the data saving is not completed (1805: NO). At this time, Step 1808 is performed.

In Step 1808, the partial failure processing unit 1604 specifies that an abnormality occurs in any one of the failed FMPKG 113 and the saving destination FMPKG 113. In a case where the saving destination FMPKG 113 detects an abnormality (1808: saving destination), Step 1810 is performed.

In Step 1810, the partial failure processing unit 1604 determines whether there is another preliminary FMPKG 113 which can be selected as the saving destination FMPKG 113 instead of the abnormal FMPKG 113. In a case where there is another preliminary FMPKG 113 (1810: NO), the partial failure processing unit 1604 returns to Step 1803.

In a case where there is no other preliminary FMPKG 113 (1810: YES), and the abnormal places is the saving destination FMPKG 113 (1808: saving source), the recovery of data is not possible. In this case, Step 1809 is performed.

In Step 1809, the partial failure processing unit 1604 performs a failure process of the recovery. In the failure process, for example, the partial failure FMPKG 113 is closed, and the exchange of the partial failure FMPKG 113 is recommended to the user through the management terminal 104.

In the above example, the data equal to or more than the lost data is saved in the preliminary FMPKG 113. As another example, the data amount to be saved may be determined on the basis of a remaining preliminary region capacity (the available capacity of the preliminary region) of the partial failure FMPKG 113 and the size of the lost data. For example, the partial failure processing unit 1604 acquires information of the remaining preliminary region capacity from the partial failure FMPKG 113, and saves the data of an amount obtained by adding a predetermined value (or 0) to a difference between the lost data amount and the remaining preliminary region capacity.

<Host Read>

Figure 19:
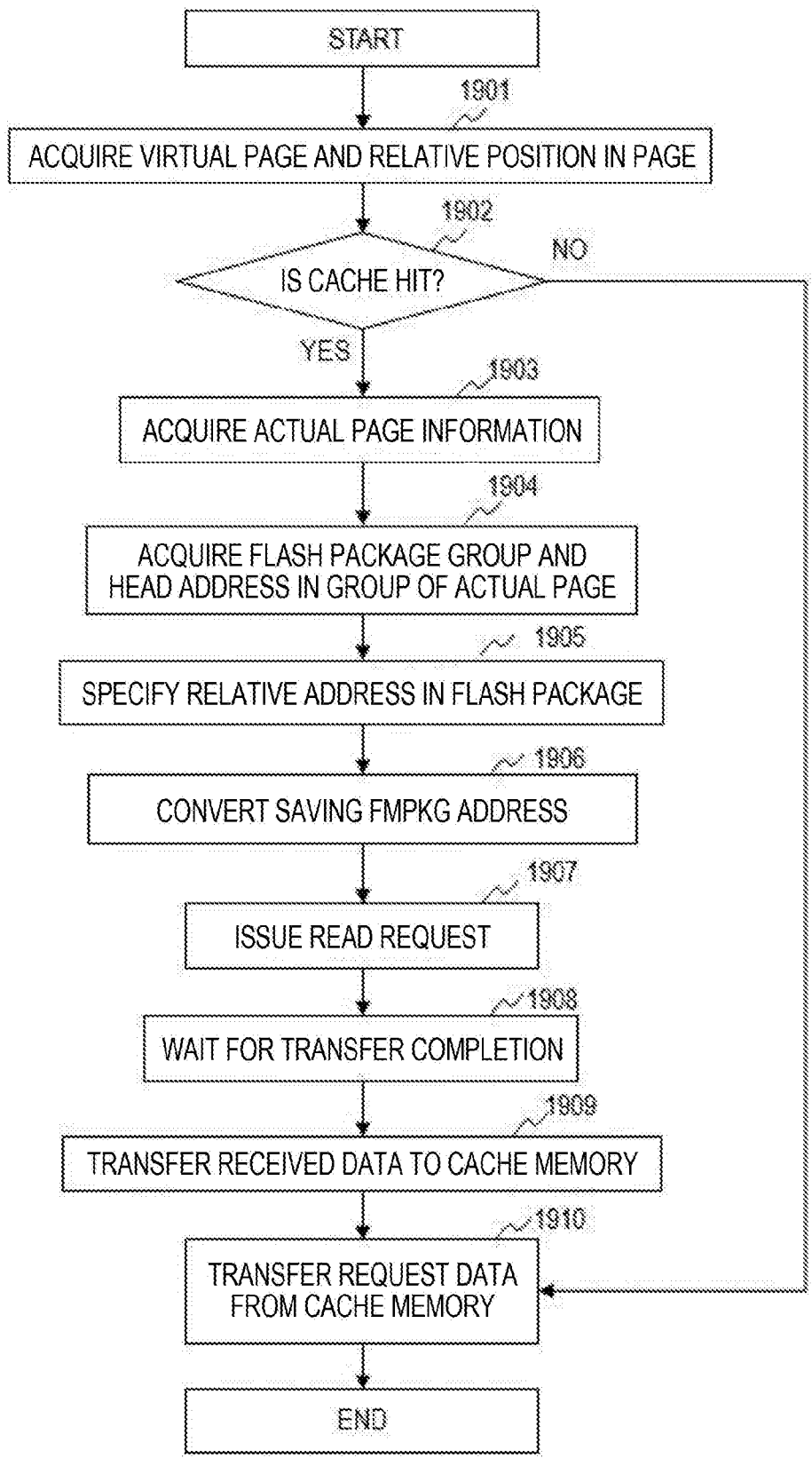
FIG. 19 is a diagram illustrating a processing flow of a read processing unit.

A processing flow of the read processing unit 1601 will be described in detail using FIG. 19. The read processing unit 1601 is performed when the storage controller 102 receives the read request from the host computer 103.

In Step 1901, the read processing unit 1601 (the CPU 108) calculates the virtual page # of the virtual page corresponding to a reading target region and the relative address in the virtual page from the address of the read target region which is designated by the received read request.

In Step 1902, the read processing unit 1601 checks whether the read target data is stored (hit) in a cache memory (the main memory 109). This is performed by a well-known technique. In a case where the data is hit (Step 1902: YES), next Step 1910 is performed. In a case where the data is not hit (Step 1902: NO), next Step 1904 is performed.

In Step 1903, the read target data needs to be loaded to the cache memory. The read processing unit 1601 specifies the actual page information table 302 of the actual page which is assigned to a read target virtual page with reference to the actual page pointer 404 of the logical volume information table 301. The actual page assigned to the read target virtual page will be called a "read target actual page" in the following description.

In Step 1904, the read processing unit 1601 calculates the RG 204 to which the read target actual page belongs and the address in the RG 204 where the read target actual page (head) is located from the RG ID 501 of the specified actual page information table 302 and the actual page address 502.

In Step 1905, the read processing unit 1601 calculates a position on the actual page which the read target data is stored (specifically, the relative address in the actual page) from the relative address in the virtual page obtained in Step 1901 and the RG RAID type 602. The read processing unit 1601 specifies the ID of the FMPKG 113 where the read target data is stored and the address in the FMPKG 113 using the relative address in the calculated actual page, the RG RAID type 602, and the FMPKG pointer 605.

In Step 1906, the read processing unit 1601 refers to the data saving address table 306 related to the ID of the corresponding FMPKG 113 using the ID of the FMPKG 113 acquired in Step 1905. Next, the area number to which the address in the FMPKG 113 acquired in Step 1905 belongs is specified.

In a case where the saving flag corresponding to the specified area number indicates "save", the read processing unit 1601 acquires the ID of the corresponding saving destination FMPKG 113, and replaces the ID of the read FMPKG 113 with the ID of the corresponding saving destination FMPKG 113. In a case where the saving flag corresponding to the specified area number indicates "No saving", the read processing unit 1601 performs nothing.

In Step 1907, the read processing unit 1601 issues the read request to the address of the FMPKG 113 which is specified in Step 1906. In Step 1908, the read processing unit 1601 waits for data which is sent from the FMPKG 113.

In Step 1909, the read processing unit 1601 secures a region to save the read target data in the main memory 109, and stores the data sent from the FMPKG 113 in the secured region. Thereafter, Step 1910 is performed. In Step 1910, the read processing unit 1601 reads the read target data from the main memory 109, sends the data to the host computer 103, and ends the process.

<Host Write>

Figure 21:
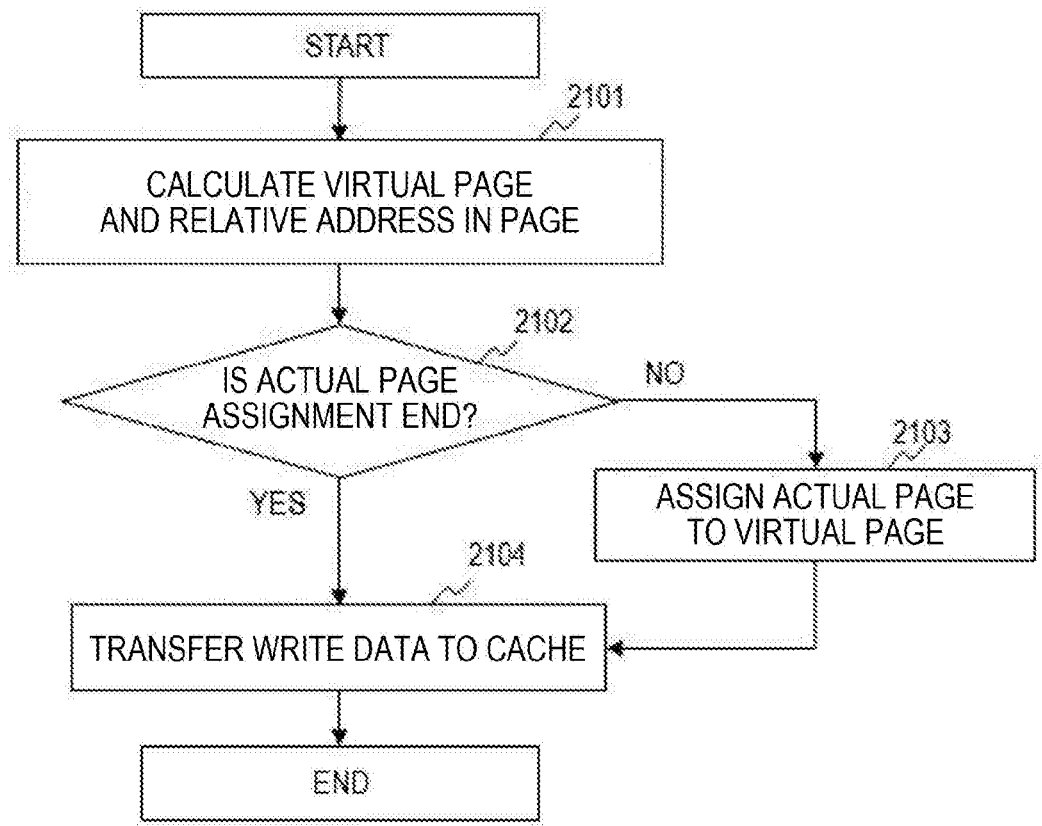
FIG. 21 is a diagram illustrating a processing flow of a write request receiving unit.

FIG. 21 illustrates a processing flow of the write request receiving unit 1602. The write request receiving unit 1602 is performed when the storage controller 102 receives the write request from the host computer 103.

In Step 201, the write request receiving unit 1602 (the CPU 108) calculates the virtual page # of the virtual page corresponding to the write target region and the relative address in the virtual page from the address of the write target region which is designated by the received write request.

In Step 2102, the write request receiving unit 1602 specifies the logical volume information table 301 of the logical volume which is designated by the write request. Then, the write request receiving unit 1602 checks whether the actual page is assigned to the virtual page specified in Step 2101 with reference to the actual page pointer 404 in the specified logical volume information table 301. In a case where the actual page is assigned, Step 2103 is skipped, and next Step 2104 is performed.

In Step 2103, the write request receiving unit 1602 assigns the actual page to the virtual page corresponding to the write target region. The write request receiving unit 1602 determines an RG 204 of which the actual page is assigned with reference to the RAID type 403 of the logical volume information table 301 specified in Step 2102, the RG RAID type 602 of each RG information table 304, and the number of empty actual pages 604.

The write request receiving unit 1602 changes the empty actual page pointer 404 of the head to be indicated by the actual page pointer 404 of the virtual page to which the write target region belongs with reference to the empty actual page management information pointer 303 of the determined RG 204. With this configuration, the actual page is assigned to the virtual page to which the write target region belongs.

Further, the empty actual page management information pointer 303 is changed to indicate the next actual page information table 302 (the actual page information table 302 indicated by the empty page pointer 503 in the actual page information table 302 of the actual page assigned to the virtual page). Further, the empty page pointer 503 in the actual page information table 302 of the actual page assigned to the virtual page is nullified.

The write request receiving unit 1602 reduces the number of empty actual pages 604 of the RG information table 304 corresponding to the actual page. In this embodiment, the virtual page is assigned to the actual page when the write request is received. However, the assigning process may be not performed until the data is stored to the FMPKG 113.

In Step 2104, the write request receiving unit 1602 stores the write data designated by the write request from the host computer 103 in the main memory 109. When the write data is stored in the main memory 109, the write request receiving unit 1602 stores the write data with the writing position information of the write data (the ID of the FMPKG 113 and the address (LBA) on the flash volume). Thereafter, the process is ended.

Since the RG 204 includes a RAID configuration, there is no need to generate the redundancy data corresponding to the write data which is stored on the main memory 109. The redundancy data is stored in the parity stripe block which belongs to the same stripe line as the data stripe block where the write data is stored. Such a configuration is the well-known technique, and the details there of will not be described. The generation of the redundancy data is performed immediately after Step 2104 for example. The CPU 108 once stores the redundancy data in the main memory 109 when the redundancy data is created.

As described above, in addition to the data stripe block where the data is stored, the parity stripe block to store the redundancy data corresponding to the data is also uniquely determined from the address on the virtual page. Even in a case where there is saving data, the address of the saving destination FMPKG 113 can be acquired with reference to the data saving address table 306 similarly to the processing flow of the read processing unit 1601 described above. Further, the CPU 108 adds the position information to the redundancy data similarly to the write data when the redundancy data is stored in the main memory 109.

The write data and the redundancy data are written to the FMPKG 113 by the write-after processing unit 1603. However, the write data and the redundancy data are written to any FMPKG 113, so that there is no need to distinguish the write data and the redundancy data by the FMPKG 113. Therefore, the write-after processing unit 1603 performs the same process in a case where the write data is written and in a case where the redundancy data is written.

<Destage>

Figure 22:
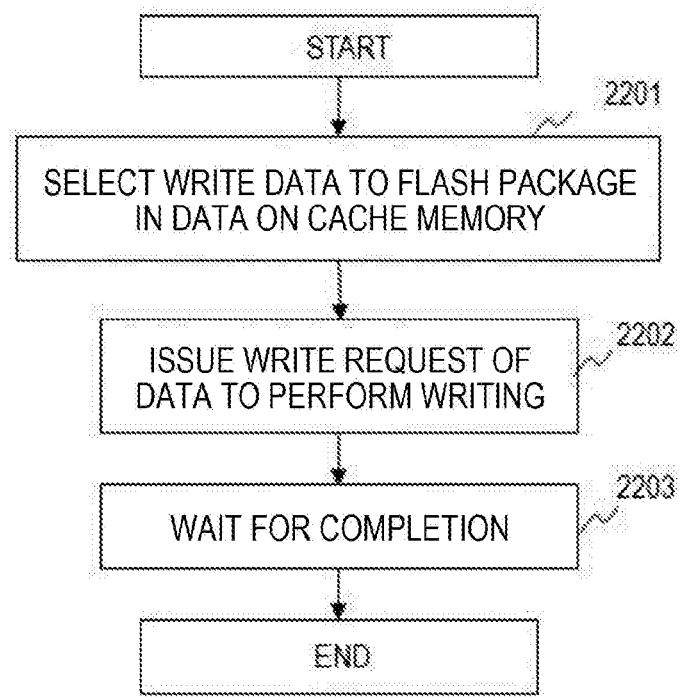
FIG. 22 is a diagram illustrating a processing flow of a write-after processing unit.

FIG. 22 illustrates a processing flow of the write-after processing unit 1603. The write-after processing unit 1603 is performed by a predetermined trigger of the CPU 108. For example, the write-after processing unit 1603 may be performed periodically. The write-after processing unit 1603 may be performed at the point of time when dirty data amount on the main memory 109 exceeds a predetermined amount.

The write-after processing unit 1603 performs a process on the FMPKG 113 to write the write data or the redundancy data acquired from the host computer 103. The write-after processing unit 1603 performs the process without distinguishing the write data and the redundancy data as data to be written in the FMPKG 113.

In Step 2201, the write-after processing unit 1603 (the CPU 108) searches the main memory 109, and determines data to be written in the FMPKG 113. The write-after processing unit 1603 extracts the writing position information which is assigned to the read-out data. Herein, the description will be given about an example where the range of the region to be written by the write-after processing unit 1603 is not over a plurality of FMPKGs 113.

In Step 2202, the write-after processing unit 1603 issues the write request to the target FMPKG 113 on the basis of the writing position information. In a case where the redundancy data is written, the write-after processing unit 1603 may issue an instruction that the redundancy data is not an object of duplication.

In Step 2203, the write-after processing unit 1603 waits for the completion of the write request. The write-after processing unit 1603 ends the process when receiving an end report related to the write request from the FMPKG 113.

<Failure Detection of FMPKG>

Next, the process performed by the controller unit 1101 in the partial failure FMPKG 113 will be described. Further, the process performed by the controller unit 1101 is realized by the processor 1106 which performs a program in the controller unit 1101 in principle. In addition, the program is stored in the main memory 1107.

In FIG. 13, the program related to this embodiment which indicates the program related to this embodiment which is stored in the main memory 1107 is a failure detection program 1308. Further, in the following description, a process described using the program (the failure detection program 1308) as a subject means that the program (the failure detection program 1308) is performed by the processor 1106.

Figure 20:
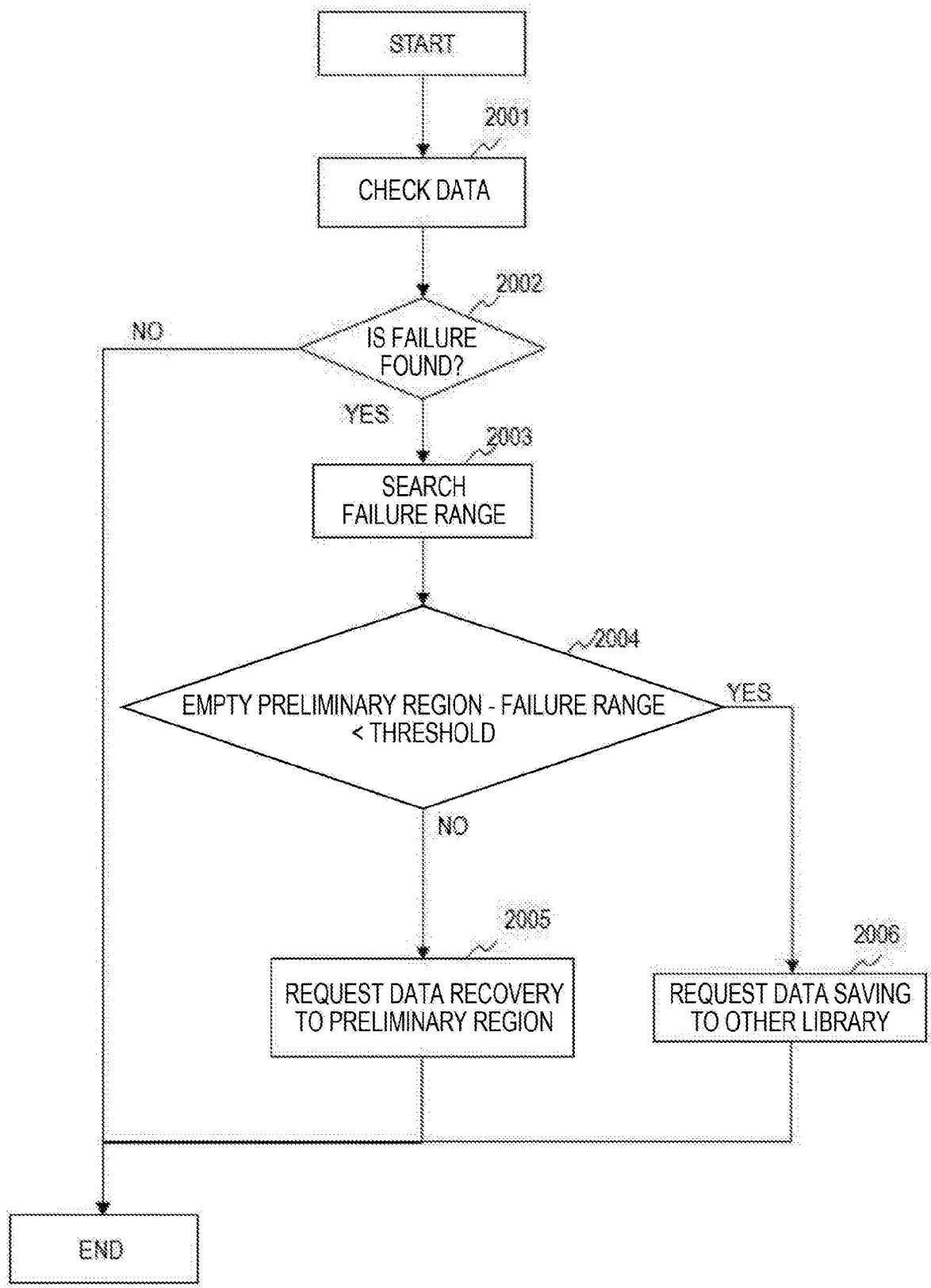
FIG. 20 is a diagram illustrating a processing flow of a failure detection program.

FIG. 20 illustrates a process of the failure detection program in which the controller unit 1101 of a certain FMPKG 113 detects a failure in the FMPKG 113. The process may be triggered in a case where an I/O process is not completed as a result of the process on the I/O request from the host device 112 for example. However, this trigger is not limited to the above configuration. The process may be performed periodically by the inner process of the FMPKG 113 even when there is no I/O request from the host device 112.

In Step 2001, the failure detection program 1308 tries to read the data stored in a certain physical region. The physical region is, for example, a physical page to which the host device 112 directly makes an access by the I/O process. The physical region may be a region which is scheduled to make an access to all the regions in the FMPKG 113 within a predetermined time period. The regions may be thinned out in a unit of block in order to effectively access to all the regions in the FMPKG 113.

In a case where all the stored data is read correctly as a result of the process of Step 2001 (2002: NO), there is no failure, and the diagnosis process ends. On the other hand, in a case where there is some stored data not correctly read as a result of the process of Step 2001 (2002: YES), the physical region is considered as failure, and Step 2003 is performed.

In Step 2003, the failure detection program 1308 searches a failure range in order to determine whether there is a similar failure in a higher physical unit. The failure detection program 1308 reads several pages from the dame block as the failed page, or reads several pages from the block for sharing the same plane for example. As a result of the process, a physical failure range is specified. Thereafter, the failure detection program 1308 specifies the logical address and length information by the physical-logical conversion, and specifies a data amount by the failure.

The failure detection program 1308 registers a failure unit determined in the process in the FM management information table 1307. If the failure range is a block, a failure block number is erased from the valid block pointer 1501, and registered in the invalid block pointer 1502.

In a case where the failure range is a plane, the information is erased and registered also to the valid plane pointer 1503 and the invalid plane pointer 1504 in addition to the valid block pointer 1501 and the invalid block pointer 1502.

Similarly to the case of the die and the chip, the information is registered also to the failure range of the lower range in addition to the pointer registration of the failure range. After specifying the failure range, the logical address of the lost data is acquired. The logical address is acquired by, for example, using the logical-physical conversion information table 1302.

In Step 2004, the failure detection program 1308 compares the lost data amount (failure range) with the empty preliminary region. In a case where a value obtained by subtracting the lost data amount from the empty preliminary region is equal to or more than a predetermined value (for example, 0) (2004: NO), Step 2005 is performed.

In Step 2005, the failure detection program 1308 issues a data recovery request to the host device 112. The preliminary region previously included in the partial failure FMPKG 113 is assigned to the user data, so that the failure data can be recovered. Therefore, before issuing the data recovery request, the failure detection program 1308 creates the failure notification 1001 on the basis of the lost data amount and the logical address of the lost data. The failure detection program 1308 sets the data recovery request for its own FMPKG 113 by the RAID to the request type 1002, and sets the logical address and the length of the lost data in the lost data information 1004.

In a case where the value obtained by subtracting the lost data amount from the empty preliminary region is smaller than a predetermined value (for example, 0) (2004: YES), the failure detection program 1308 performs Step 2006. In Step 2006, the failure detection program 1308 issues a data save request to the host device 112.

Before the data save request, the failure detection program 1308 creates the failure notification 1001 on the basis of the lost data amount and the logical address of the lost data. The failure detection program 1308 sets the data recovery request for the FMPKG 113 of the saving destination by the RAID to the request type 1002, and sets the logical address and the length of the lost data in the lost data information 1004.

In the above example, the FMPKG 113 performs the determination on the data saving/recovery. However, the storage controller 102 may perform the determination on the data saving/recovery. The storage controller 102 acquires the information of the empty preliminary region capacity in addition to the lost data from the FMPKG 113.

Second Embodiment

Figures 23, 24:
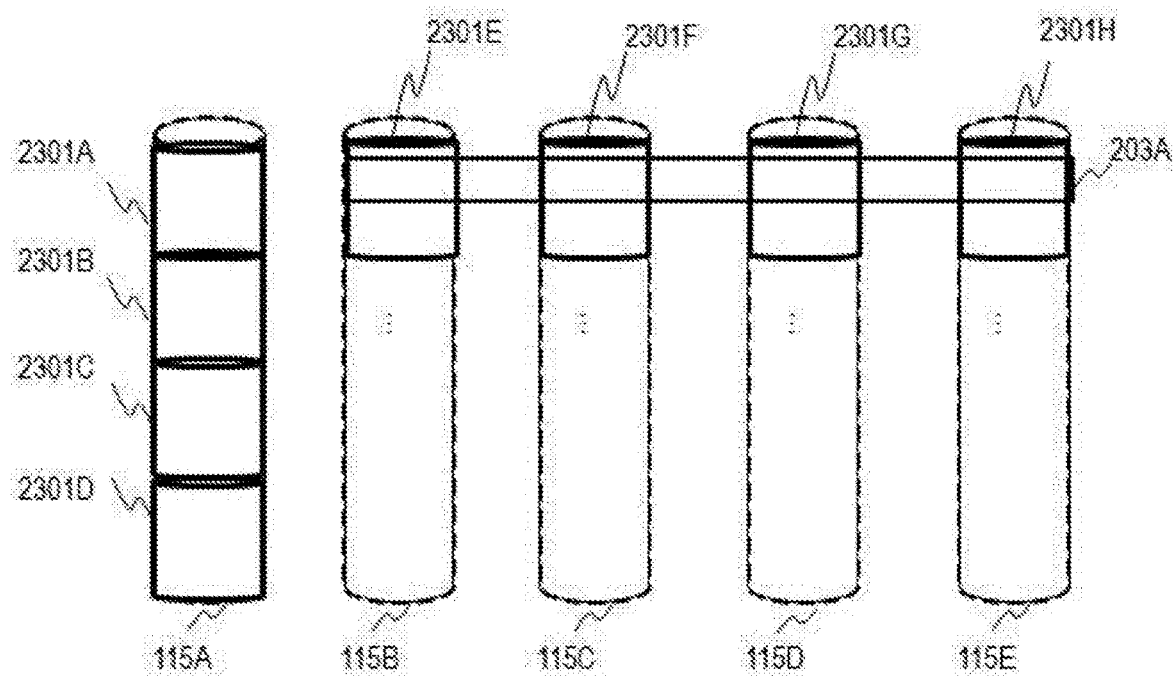
FIG. 23 is a diagram illustrating a relation between a virtual flash memory package and the flash memory package in a second embodiment.
FIG. 24 is a diagram illustrating a format of a VFMPKG management table in the second embodiment.

In this embodiment, one FMPKG is divided by the logical address and managed. Using FIG. 23, a relation between the flash volume (FMPKG), the virtual FMPKG (hereinafter, referred to as VFMPKG), and the actual page will be described. FIG. 23 illustrates the flash volumes 115A to 115E, VFMKGs 2301A to 2301H, and the actual page 203A. Hereinafter, a VFMKG 2301 indicates one or more VFMKGs.

In this embodiment, the flash volume 115 of one FMPKG 113 is divided into a plurality of regions by the logical address. The divided each region is assigned with a VFMPKG number which is a virtual FMPKG number. The host device 112 recognizes one region, which is divided, as one FMPKG. The host device 112 forms a RAID by the plurality of VFMPKGs 2301. In this embodiment, data is saved in a unit of VFMPKG. With this configuration, it is possible to effectively suppress that the I/O performance is lowered after saving. Further, in this embodiment, the information of the area in the first embodiment is not necessary.

FIG. 24 illustrates a VFMPKG management table 2401. The VFMPKG management table 2401 is stored in the main memory 109. The number of VFMPKG management tables 2401 is matched with the number of FMPKGs 113.

As illustrated in FIG. 24, the VFMPKG management table 2401 includes an FMPKG number 2501, a start address 2502, an end address 2503, and a VFMPKG number 2504. The start address 2502 and the end address 2503 indicate from which address range the VFMPKG 2301 comes from the belonging FMPKG 113.

Hereinafter, the operation of the storage system in the data saving process when the partial failure occurs will be described. Most operations are the same as the first embodiment, and the description below will be focused on the differences. In addition, in this embodiment, the FMPKG 113 described in the first embodiment is not particularly limited to the description, but indicates the VFMPKG 2301.

Figure 25:
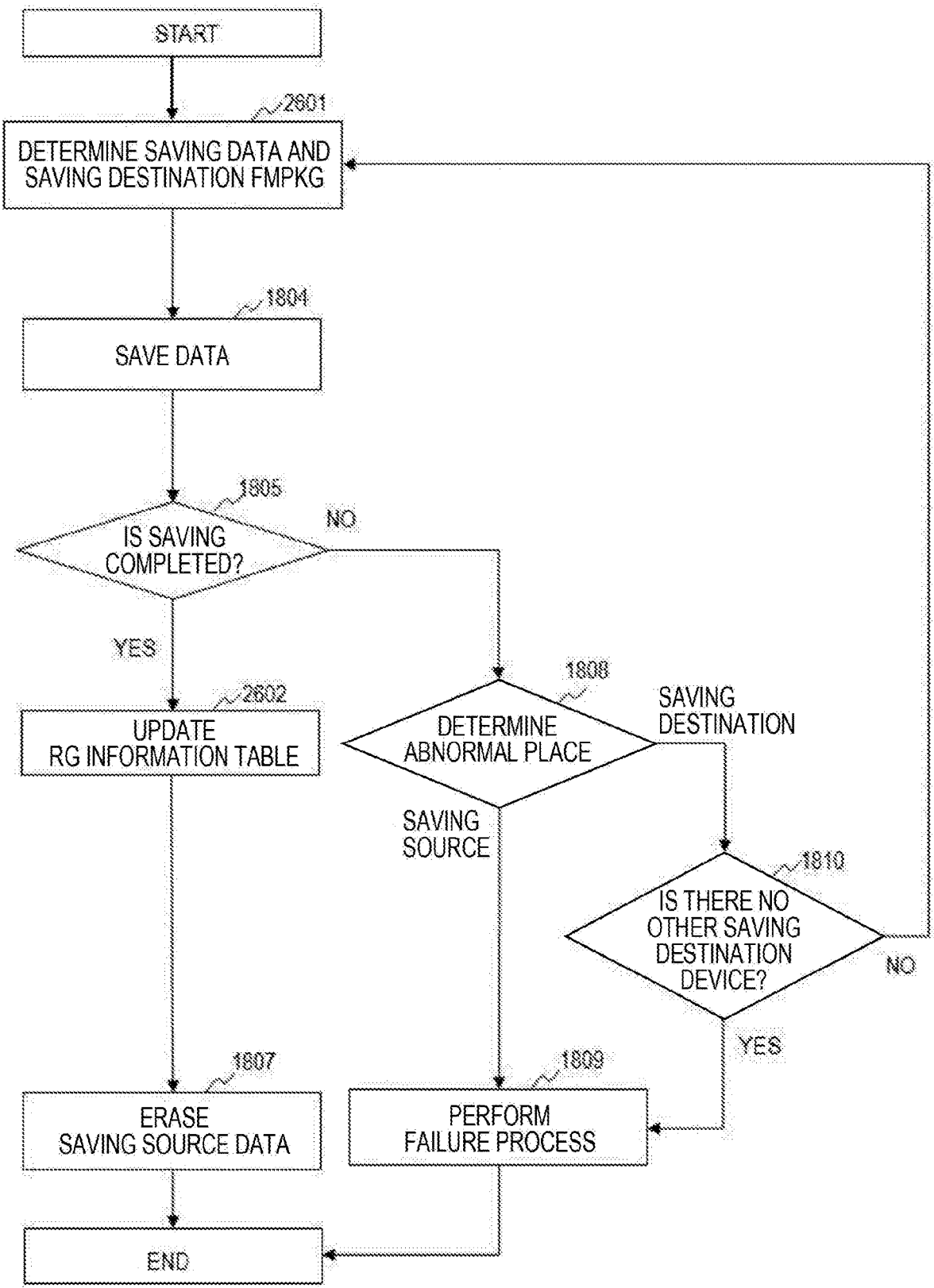
FIG. 25 is a diagram illustrating of a flow of the data saving process in the second embodiment.

FIG. 25 illustrates a flow of saving the saving data of the failed VFMPKG 2301 to the saving destination VFMPKG 2301 by the partial failure processing unit 1604. This flow is performed in Step 1706 described in the first embodiment.

In Step 2601, the partial failure processing unit 1604 determines the saving data and the saving destination VFMPKG 2301 using the ID of the failed FMPKG 113, the saving data amount, the preliminary FMPKG information table 307 which are acquired in Step 1701 described in the first embodiment. In this example, one preliminary FMPKG information table 307 indicates the information of one preliminary VFMPKG 2301, and the column of the area number is omitted. Even in the saving data information table 306, the column of the area number is omitted.

Figure 26:
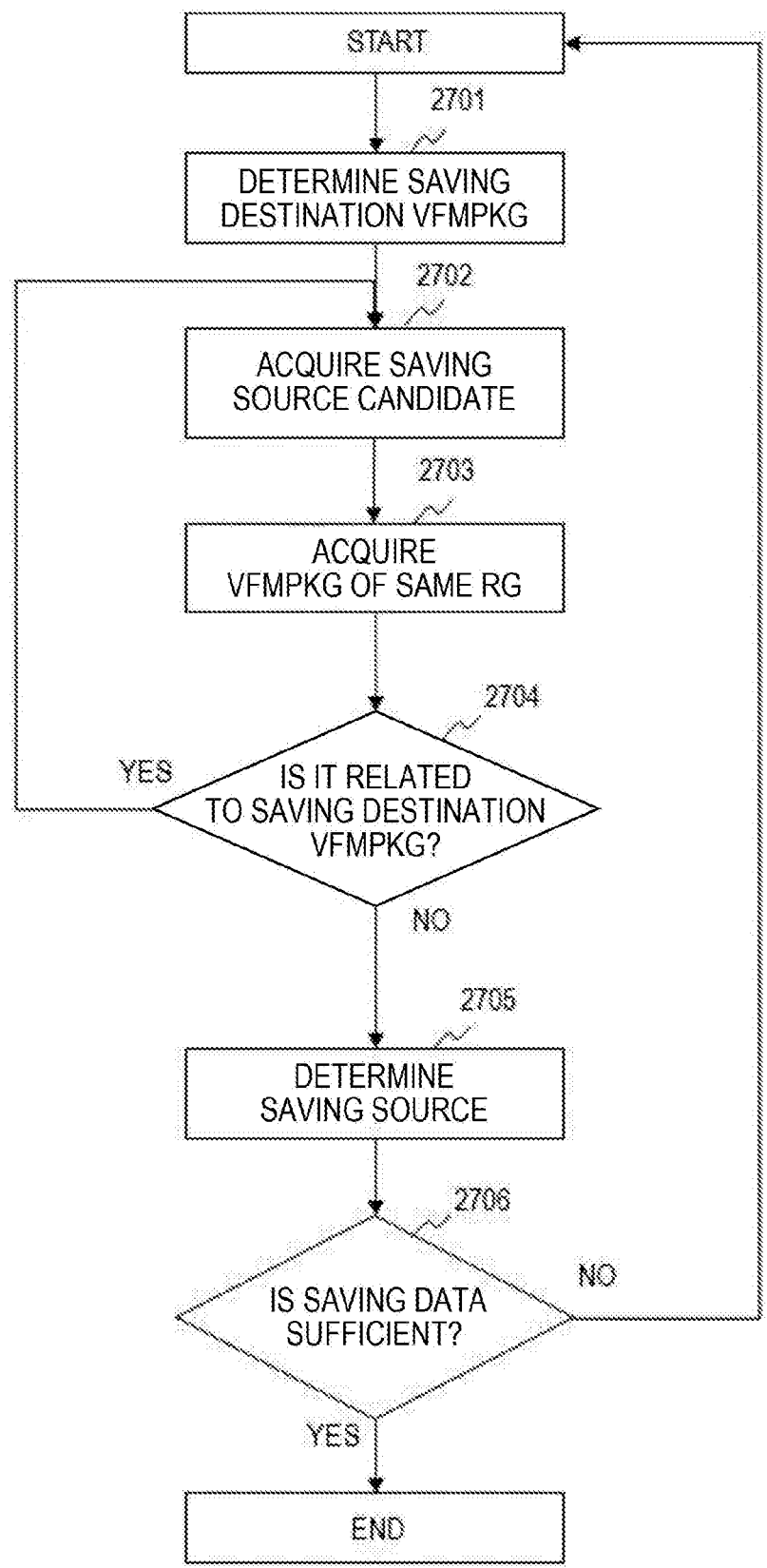
FIG. 26 is a diagram illustrating a flow of saving data selection in the second embodiment.

The details of Step 2601 will be described using FIG. 26. In Step 2701, the partial failure processing unit 1604 selects the saving destination VFMPKG 2301 using the preliminary FMPKG information table 307. In Step 2702, the partial failure processing unit 1604 selects one VFMPKG number among the VFMPGK numbers contained in the partial failure FMPKG 113. The selected VFMPKG 2301 is called a saving source candidate VFMPKG 2301.

In Step 2703, next, the partial failure processing unit 1604 specifies the RG 204 to which the saving source candidate VFMPKG 2301 belongs using the RG information table 304, and acquires a list of the VFMPKG numbers 2504 which form the same RG 204 as the saving source candidate VFMPKG 2301. In Step 2704, the partial failure processing unit 1604 determines whether the ID of the acquired VFMPKG is contained in the saving destination FMPKG 113 using the VFMPKG management table 2401 which is related to the saving destination FMPKG 113.

In a case where one or more VFMPKG numbers 2504 contained in the list of the acquired VFMPKG numbers 2504 are contained in the saving destination FMPKG 113 (2704: YES), the data of the saving source candidate VFMPKG 2301 is not possible to be saved to the saving destination FMPKG 113. This is because, in a case where the saving destination FMPKG 113 is failed, there are two failed places in the RG 204 to which the saving source candidate VFMPKG 2301 belongs.

Therefore, the partial failure processing unit 1604 selects a new saving source candidate VFMPKG 2301 again. Further, the partial failure processing unit 1604 may terminate the reselecting after trying by several times, and may end the process. In this case, the partial failure processing unit 1604 performs the failure process as a saving failure.

In a case where all the VFMPKG numbers 2504 contained in the list of the acquired VFMPKG numbers 2504 are not those generated from the saving FMPKG 113 (2704: NO), Step 2705 is performed. In Step 2705, the partial failure processing unit 1604 determines the saving source candidate VFMPKG 2301 as the saving source VFMPKG 2301.

In Step 2706, the partial failure processing unit 1604 compares the capacities of one or more VFMPKGs 2301 determined as the saving source VFMPKG 2301 with the capacity of the lost data. In a case where the capacity of the lost data is larger (2706: NO), the procedure returns to Step 2701 to select a new saving source candidate VFMPKG 2301 from the failed FMPKG 113. In a case where the saving source VFMPKG 2301 is larger (2706: YES), the selecting of the saving source VFMPKG 2301 ends.

Next, Step 2602 will be described again using FIG. 25. In the RG information update 2602, the partial failure processing unit 1604 replaces the entry of the FMPKG pointer 605 pointing the saving source VFMPKG 2301 with the saving destination VFMPKG number in the RG information table 304 to which the saving source VFMPKG 2301 belongs on the basis of a saving source VFMPKG number determined in Step 2601 and a saving destination VFMPKG number.

As described above, since the data is saved in a unit of VFMPKG, it is possible to effectively suppress that the I/O performance is lowered after data saving.

<Host Read>

Figure 27:
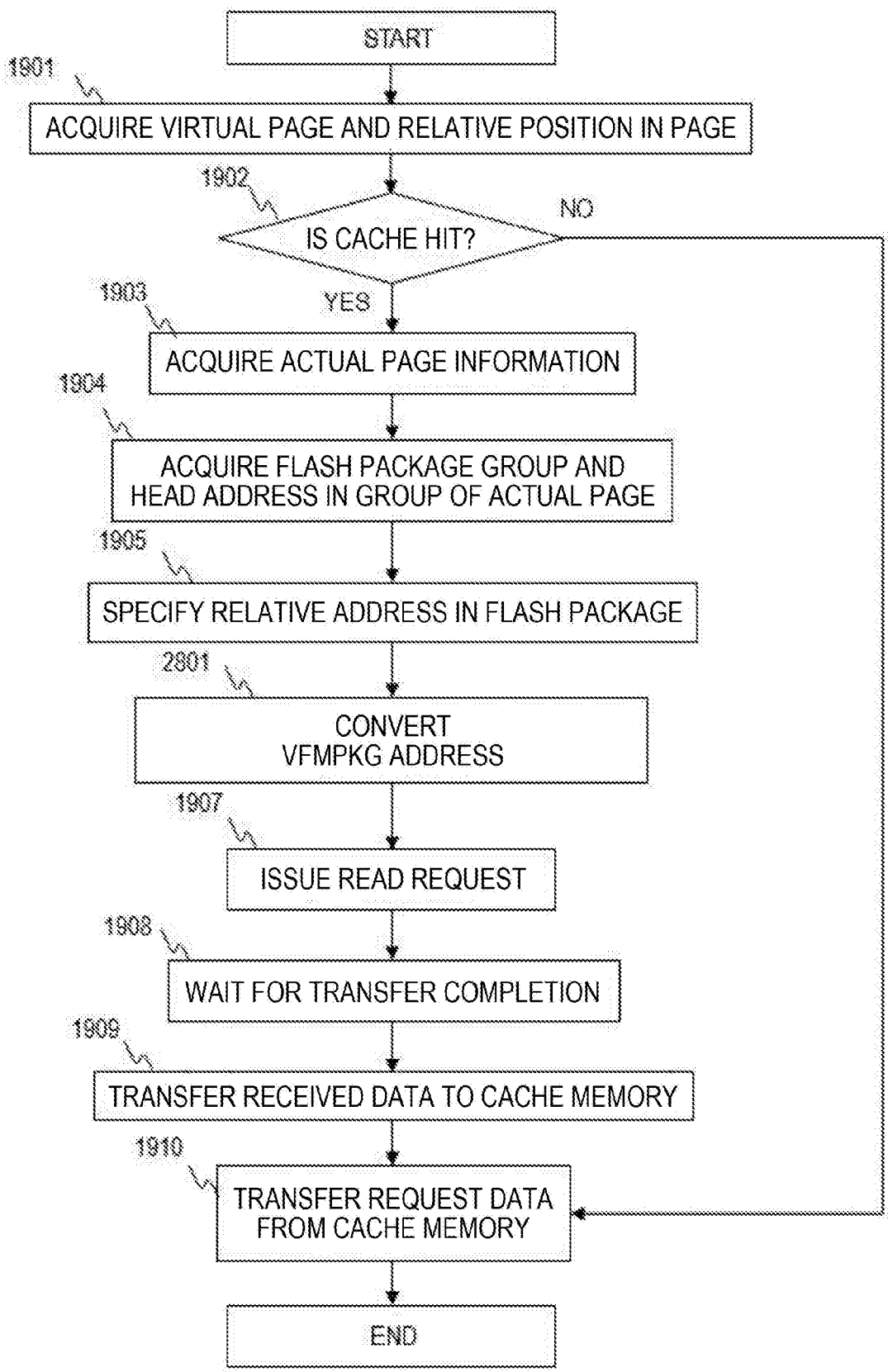
FIG. 27 is a diagram illustrating a processing flow of the read processing unit in the second embodiment.

A processing flow of the read processing unit 1601 will be described in detail using FIG. 27. The read processing unit 1601 is performed when the storage controller 102 receives the read request from the host computer 103.

The first embodiment acquires the ID of the saving destination FMPKG 113 in Step 1906. In this embodiment, the FMPKG pointer 605 already contained in the RG information table 304 is replaced with the saving VFMPKG 2301. Therefore, the VFMPKG where the data is stored can be specified uniquely, and Step 1906 is not necessary.

Instead, the read processing unit 1601 performs Step 2801. In Step 2801, the read processing unit 1601 converts the relative address in the VFMPKG 2301 to the relative address in the FMPKG 113 using the VFMPKG management table 2401. Specifically, the value obtained by adding the start address 2502 of the VFMPKG 2301 to the relative address in the VFMPKG 2301 is the relative address in the FMPKG 113. Hereinafter, this configuration is the same as that described in the first embodiment. In addition, the host write is also the same as the first embodiment, and thus the description will be omitted.

Third Embodiment

In the first embodiment and the second embodiment, the data saving address table 306 is stored in the main memory 109 but, in this embodiment, the data saving address table 306 is stored in the main memory 1107. In this embodiment, in addition to the components described in the first and second embodiments, the data saving address table 306 and the preliminary FMPKG information table 307 are stored in the main memory 1107.

In this embodiment, the operation of the storage system 101 in the data saving process when the partial failure occurs will be described. Further, most operations are the same as the first and second embodiments, and the description below will be focused on the differences. The different operations are the referring and updating of the data saving address table 306 and the preliminary FMPKG information table 307 which are described in the first and second embodiments.

In this embodiment, these tables are stored in the main memory 1107 in the FMPKG 113. Therefore, the referring and the updating are performed such that each program performed in the storage system 101 issues a refer command and an update command to the FMPKG 113, and receives the results.

<Host Read>

Figure 28:
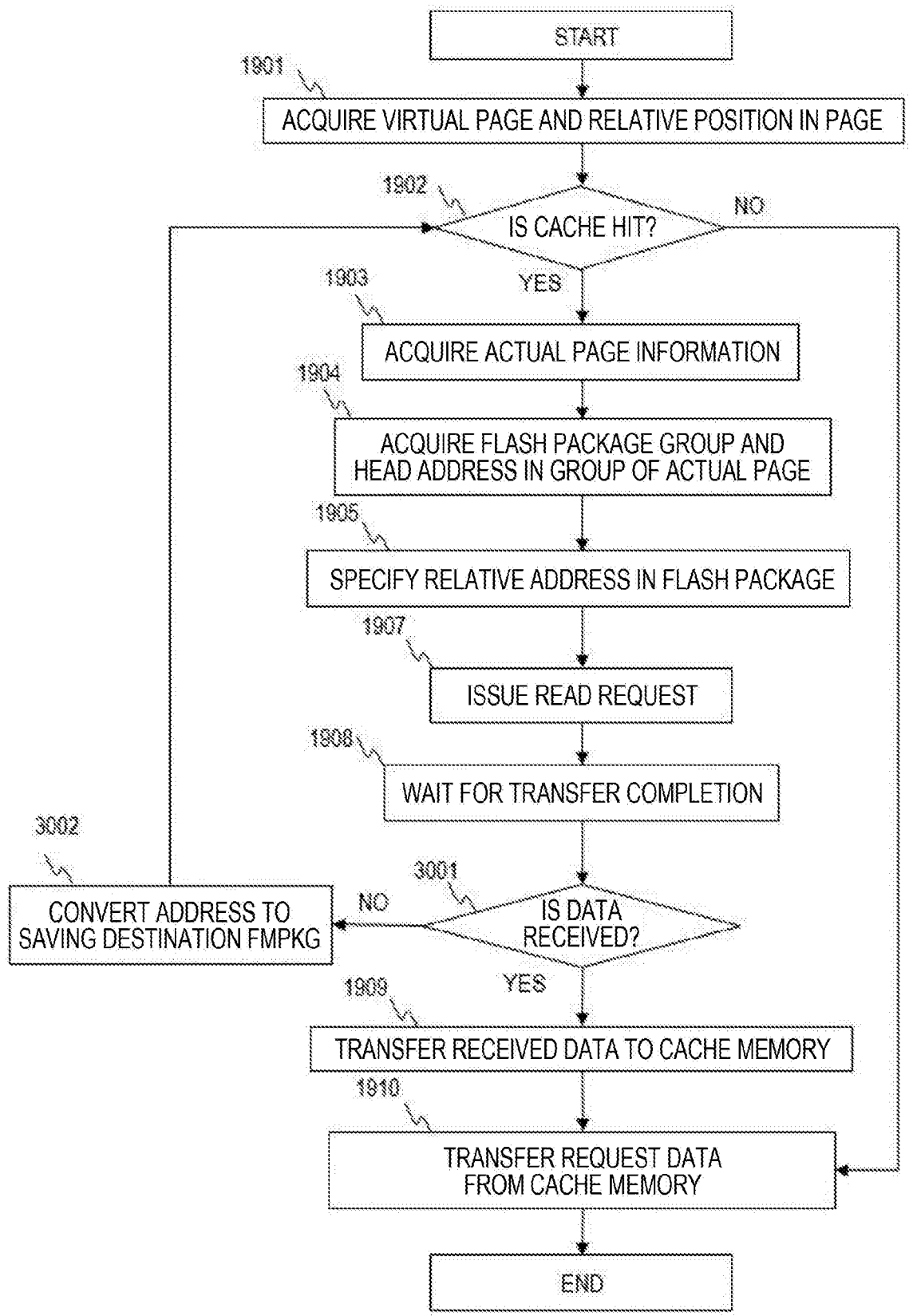
FIG. 28 is a diagram illustrating a flow of an I/O process of the flash memory package in a third embodiment.

A processing flow of the read processing unit 1601 will be described in detail using FIG. 28. The read processing unit 1601 is performed when the storage controller 102 receives the read request from the host 103. In the first embodiment and the second embodiment, the ID of the saving destination FMPKG 113 is acquired in Step 1906 and Step 2801, but it is omitted in this embodiment.

Instead, the ID of the saving FMPKG may be received instead of the request data in the response from the FMPKG 113 which issues the read request in Step 1907 (Step 3001: NO). At this time, Step 3002 is performed. In Step 1907, in a case where the request data is received from the response from the FMPKG 113 which issues the read request, the process similar to the first and second embodiments is performed, and the description will be omitted.

In Step 3002, the read processing unit 1601 replaces the address acquired in Step 1905 with the ID of the saving FMPKG received in Step 3001, and performs Step 1907 again. With this configuration, the saving data can be received.

<Destage>

Figure 29:
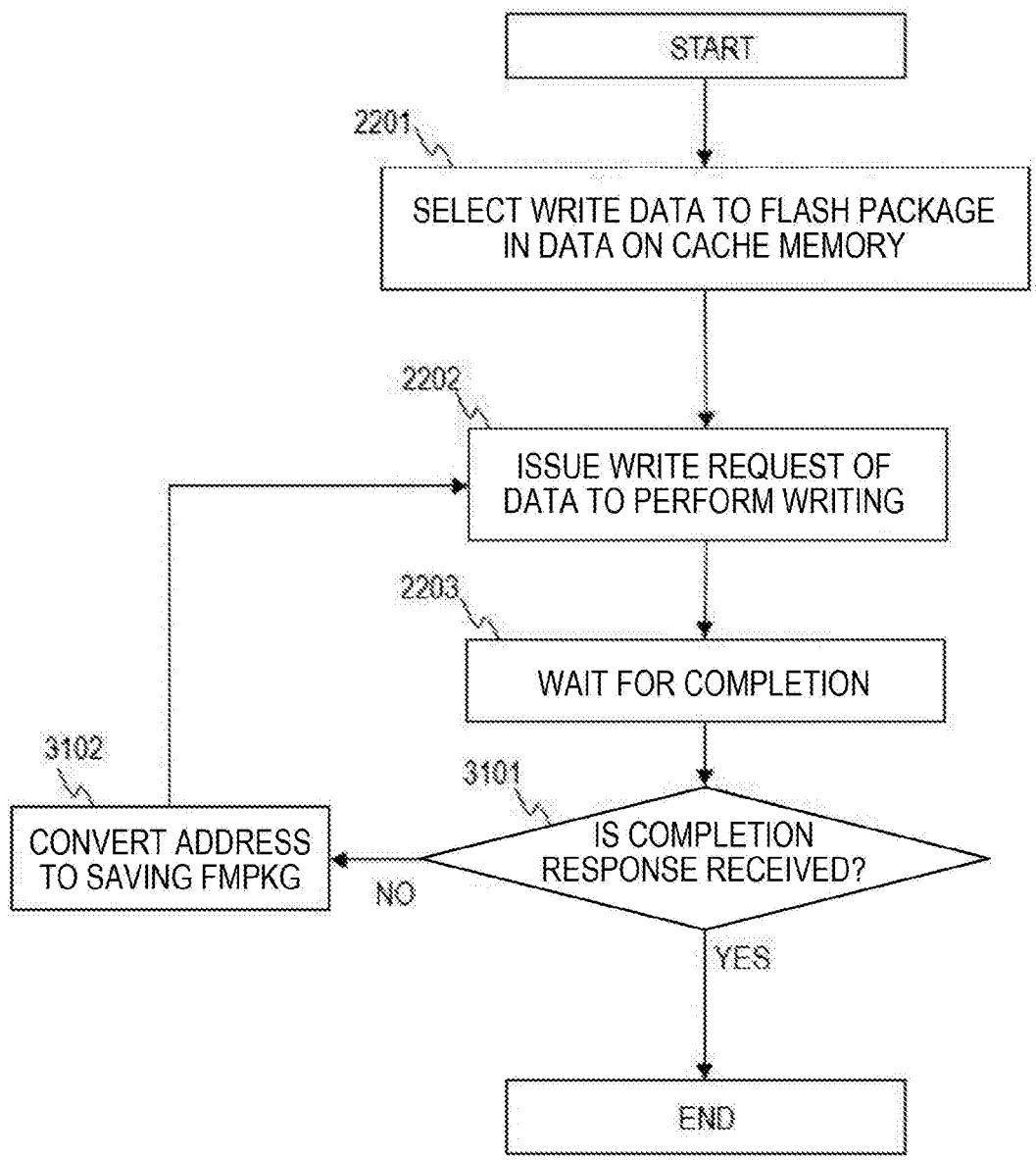
FIG. 29 is a diagram illustrating a processing flow of the write-after processing unit in the third embodiment.

FIG. 29 is a processing flow of the write-after processing unit 1603. The write-after processing unit 1603 is performed by a predetermined trigger from the CPU 108. For example, the write-after processing unit 1603 may be performed periodically. The write-after processing unit 1603 may be performed at the point of time when dirty data amount on the main memory 109 exceeds a predetermined amount.

In Step 2203, the write-after processing unit 1603 waits for the completion of the write request. The write-after processing unit 1603 ends the process when an end report related to the write request is returned from the FMPKG 113 (Step 3101: YES).

After Step 2203, the ID of the saving FMPKG related to the write request may be returned from the FMPKG 113 (Step 3101: NO). This indicates that the data of the designated address is stored in another FMPKG 113 as the saving data. Then, the write-after processing unit 1603 performs Step 3102.

In Step 3102, the write-after processing unit 1603 replaces the writing position information acquired in Step 2201 with the ID of the saving FMPKG which is received in Step 3101. Thereafter, the write-after processing unit 1603 performs Step 2202 again. With this configuration, the data can be written to the saving FMPKG 113.

<Inner Process of FMPKG>

Next, the process performed by the controller unit 1101 in the FMPKG 113 will be described. The process performed by the controller unit 1101 is realized by the processor 1106 which performs a program in the controller unit 1101 in principle. In addition, the program is stored in the main memory 1107. The program related to this embodiment which is stored in the main memory 1107 is illustrated in FIG. 13.

The program related to this embodiment includes the flash storage controlling program 1306, the input/output controller controlling program 1304, and the logical-physical conversion program 1301. Further, in the following description, a process described using the program (the flash storage controlling program 1306, etc.) as a subject means that the program (the flash storage controlling program 1306, etc.) is performed by the processor 1106.

Figure 30:
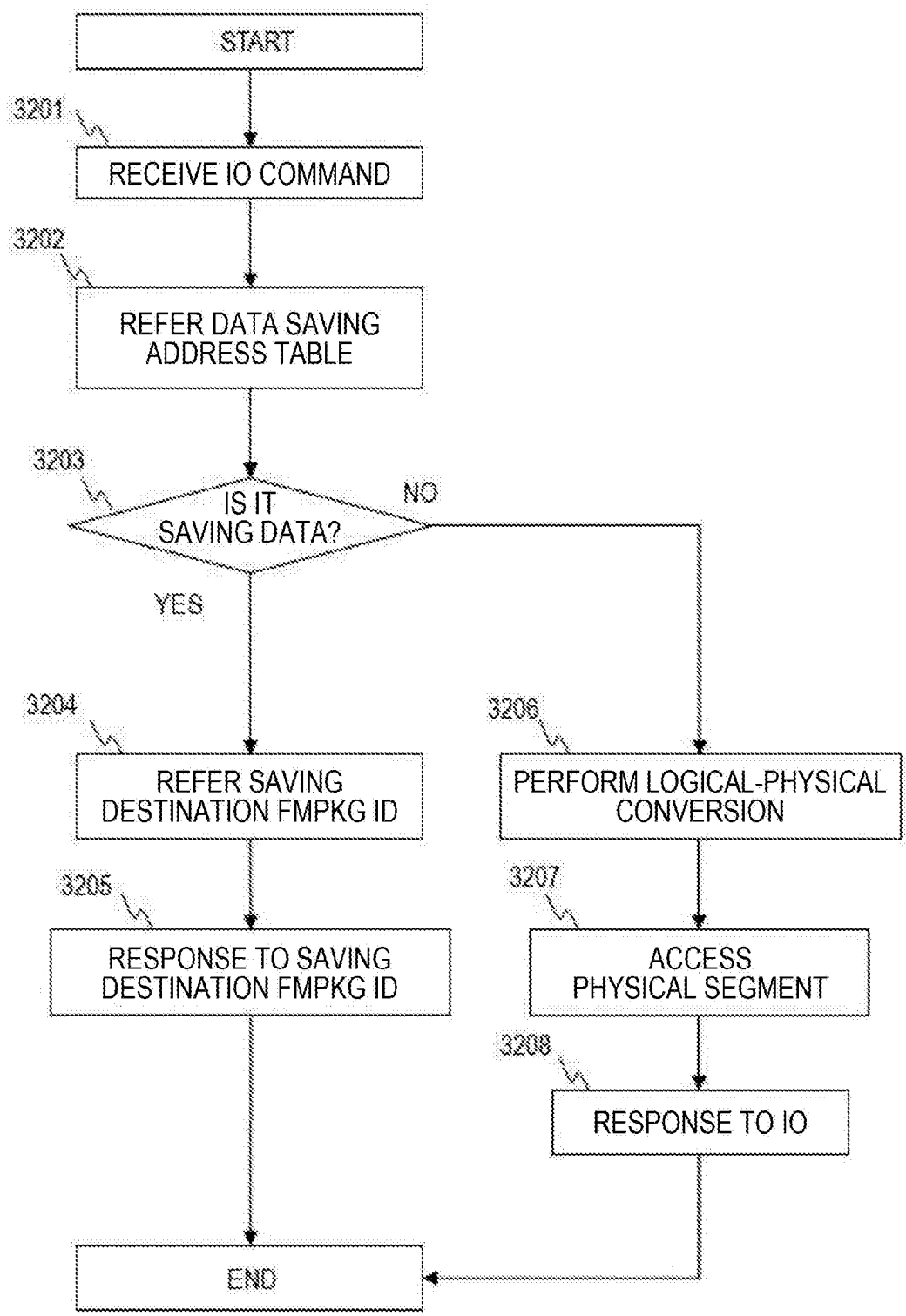
FIG. 30 is a diagram illustrating a flow of the I/O process in the FMPKG in the third embodiment.

FIG. 30 illustrates a processing flow of I/O in the FMPKG 113 in this embodiment. In Step 3201, the input/output controller controlling program 1304 receives an I/O command from the host device 112. The I/O command mainly includes a read command and a write command. In the following, the read command will be described as an example. A received command contains LBA information.

In Step 3202, the logical-physical conversion program 1301 determines whether the data related to the LBA is the saving data with reference to the data saving address table 306 on the basis of a command received by the input/output controller controlling program 1304.

In a case where the received command is not saving data (Step 3203: NO), the data related to the LBA is stored in its own FMPKG 113. Therefore, Step 3206 is performed by the logical-physical conversion program 1301. In Step 3206, the logical-physical conversion program 1301 converts the LBA into a physical segment address. This process is well known, and thus the description thereof will be omitted.

In Step 3207, the flash storage controlling program 1306 reads out the data stored in the physical segment using the physical segment address which is acquired in Step 3206. This process is well known, and thus the description thereof will be omitted. In Step 3208, the input/output controller controlling program 1304 transmits the data acquired in Step 3207 to the host device 112, and notifies a complete response. This process is well known, and thus the description thereof will be omitted.

In Step 3203, in a case where the received command is saving data (Step 3203: YES), the data related to the LBA is stored in the saving FMPKG 113. Therefore, Step 3204 is performed by the logical-physical conversion program 1301.

In Step 3204, the logical-physical conversion program 1301 acquires the saving destination FMPKG ID 803 corresponding to the LBA with reference to the data saving address table 306 on the basis of the LBA which is contained in the command received by the input/output controller controlling program 1304. In Step 3205, the input/output controller controlling program 1304 transmits the data acquired in Step 3204 to the host device 112, and notifies a complete response.

In this way, according to this embodiment, a load of the storage controller 102 can be reduced.

Further, the invention is not limited to the above embodiments, but various modifications may be contained. For example, the above-described embodiments have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

In addition, some or all of the configurations, functions, and processing units may be realized in hardware such as an integrated circuit. In addition, the configurations and the functions may be realized in software such that a processor analyzes and performs a program which realizes each function. The information of programs, tables, files to realize the functions may be stored in a memory, a recording device such as a hard disk, an SSD (Solid State Drive), or a recording medium such as an IC card and an SD card.

In addition, the control lines and the information lines are illustrated which are considered as necessary for explanation, and it does not mean that all the control lines and the information lines are necessarily illustrated for a product. In practice, almost all the configurations may be connected to each other.

The invention claimed is:

1. A computer which controls a plurality of memory drives, comprising:
   a memory;
   a processor which operates according to a program stored in the memory,
   wherein the processor selects one or more regions having a size that is equal to or greater than a predetermined size in a logical address space of a first memory drive when the first memory drive is partially failed,
   transfers data of the one or more selected regions to a preliminary memory drive,
   after transferring the one or more selected regions to the preliminary memory drive, reads data from another memory drive, which forms a RAID group with the first memory drive, to restore lost data caused by the partial failure, writes the restored lost data to the first memory drive, wherein a logical address of the data transferred from the first memory drive to the preliminary memory drive is shared in the first memory drive and the preliminary memory drive, and wherein, in a case where the data transferred from the first memory drive to the preliminary memory drive contains first lost data which is lost by the partial failure, the processor reads data from the other memory drive to restore the first lost data, and writes the restored first lost data in the preliminary memory drive.

2. The computer according to claim 1, wherein each of the plurality of memory drives is a physical memory drive which includes a plurality of virtual memory drives, wherein a region in a logical address space of the physical memory drive is assigned to each of the plurality of virtual memory drives, and wherein the processor selects one or more virtual memory drives in the first memory drive when the first memory drive is partially failed, and transfers data of the one or more selected virtual memory drives to the preliminary memory drive.

3. The computer according to claim 2, wherein no virtual memory drive included in the preliminary memory drive with the one or more virtual memory drives does not form a RAID group.

4. The computer according to claim 1, wherein the processor transmits an I/O request to the first memory drive in response to an I/O request for the one or more regions from a host, and wherein, when receiving identification information of the preliminary memory drive from the first memory drive with respect to the I/O request for the first memory drive, the processor transmits an I/O request to the preliminary memory drive.

5. A method of controlling a plurality of memory drives, comprising:

selecting one or more regions having a size that is equal to or greater than a predetermined size in a logical address space of a first memory drive when the first memory drive is partially failed;

transferring data of the one or more selected regions to a preliminary memory drive;

after transferring the one or more selected regions to the preliminary memory drive, reading data from another memory drive, which forms a RAID group with the first memory drive, to restore lost data caused by the partial failure;

writing the restored lost data to the first memory drive;

sharing, in the first memory drive and the preliminary memory drive, a logical address of the data transferred from the first memory drive to the preliminary memory drive, and in a case where the data transferred from the first memory drive to the preliminary memory drive contains first lost data which is lost by the partial failure, reading data from the other memory drive to restore the first lost data, and writing the restored first lost data in the preliminary memory drive.

6. A computer which controls a plurality of memory drives, comprising:

a memory;

a processor which operates according to a program stored in the memory, wherein the processor selects one or more regions having a size that is equal to or greater than a predetermined size or more in a logical address space of a first memory drive when the first memory drive is partially failed, transfers data of the one or more selected regions to a second memory drive, reads data from another memory drive, which forms a RAID group with the first memory drive, to restore lost data caused by the partial failure, and writes the restored lost data to the first memory drive, wherein the processor selects one or more regions having a size that is equal to or greater than the predetermined size in a case where a value obtained by subtracting a total amount of the lost data caused by the partial failure from an empty preliminary region in the first memory drive is smaller than a predetermined value.

7. The computer according to claim 6, wherein the processor receives a failure notification from the first memory drive in a case where the value obtained by subtracting the total amount of the lost data caused by the partial failure from the empty preliminary region in the first memory drive is smaller than the predetermined value, and selects one or more regions having a size that is equal to or greater than the predetermined size in response to the failure notification.

* * * * *